United States Patent
Zhang et al.

(10) Patent No.: US 10,511,367 B2
(45) Date of Patent: Dec. 17, 2019

(54) CHANNEL STATE INFORMATION SENDING METHOD, CHANNEL STATE INFORMATION RECEIVING METHOD, AND DEVICE

(71) Applicant: HUAWEI TECHNOLOGIES CO., LTD., Shenzhen, Guangdong (CN)

(72) Inventors: Ruiqi Zhang, Beijing (CN); Xueru Li, Beijing (CN); Di Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/279,329

(22) Filed: Feb. 19, 2019

(65) Prior Publication Data

US 2019/0181931 A1 Jun. 13, 2019

Related U.S. Application Data

(63) Continuation of application No. 16/146,599, filed on Sep. 28, 2018, which is a continuation of application No. PCT/CN2018/083967, filed on Apr. 20, 2018.

(30) Foreign Application Priority Data

Jun. 16, 2017 (CN) .......................... 2017 1 0459616

(51) Int. Cl.
*H04B 7/02* (2018.01)
*H04B 7/0456* (2017.01)
(Continued)

(52) U.S. Cl.
CPC ......... *H04B 7/0486* (2013.01); *H04B 7/0413* (2013.01); *H04B 7/0626* (2013.01); *H04B 7/0636* (2013.01); *H04B 7/0639* (2013.01)

(58) Field of Classification Search
CPC .. H04B 7/0486; H04B 7/0413; H04B 7/0626; H04B 7/0639
(Continued)

(56) References Cited

U.S. PATENT DOCUMENTS

2013/0129018 A1 5/2013 Ko et al.
2014/0226702 A1 8/2014 Onggosanusi et al.
(Continued)

FOREIGN PATENT DOCUMENTS

CN 101789848 A 7/2010
CN 101958773 B 1/2011
(Continued)

OTHER PUBLICATIONS

R1-1709232 Samsung et al., "WF on Type I and II CSI codebooks", 3GPP TSG-RAN WG1 #89, Hangzhou, China, May 15-19, 2017, total 24 pages.

*Primary Examiner* — Zewdu A Kassa
(74) *Attorney, Agent, or Firm* — Gregg L. Jansen

(57) ABSTRACT

A channel state information sending method, a channel state information receiving method, and a device are disclosed, to reduce resource overheads required when a terminal device feeds back CSI to a network device in a scenario of a high precision codebook-based precoding matrix. The method includes: determining, by a terminal device, a precoding matrix W; sending, by the terminal device, a signal including CSI to a network device; obtaining, by the network device, an RI and indication information based on the signal including the CSI; obtaining, by the network device, a PMI2 based on the RI and the indication information; and determining, by the network device, the precoding matrix W based on the rank indicator RI and the second precoding matrix indicator PMI2.

28 Claims, 5 Drawing Sheets

(51) Int. Cl.
*H04B 7/06* (2006.01)
*H04B 7/0413* (2017.01)

(58) Field of Classification Search
USPC ............... 375/267, 260, 259, 316, 219, 295
See application file for complete search history.

(56) References Cited

U.S. PATENT DOCUMENTS

| | | |
|---|---|---|
| 2015/0229371 A1 | 8/2015 | Kim et al. |
| 2016/0043791 A1 | 2/2016 | Nam |
| 2016/0164588 A1* | 6/2016 | Chen .................... H04B 7/0469 375/267 |
| 2017/0070277 A1 | 3/2017 | Si et al. |
| 2018/0212656 A1 | 7/2018 | Zhao et al. |
| 2018/0212663 A1 | 7/2018 | Liu et al. |

FOREIGN PATENT DOCUMENTS

| | | |
|---|---|---|
| CN | 103326812 A | 9/2013 |
| CN | 103368629 A | 10/2013 |
| CN | 103746730 A | 4/2014 |
| CN | 104662811 A | 5/2015 |
| CN | 106160926 A | 11/2016 |
| CN | 106559807 A | 4/2017 |
| EP | 3073662 A1 | 9/2016 |
| WO | 2014131031 A1 | 8/2014 |

* cited by examiner

CHANNEL STATE INFORMATION SENDING METHOD, CHANNEL STATE INFORMATION RECEIVING METHOD, AND DEVICE

CROSS-REFERENCE TO RELATED APPLICATION

This application is a continuation of U.S. patent application Ser. No. 16/146,599, filed on Sep. 28, 2018, which is a continuation of International Application No. PCT/CN2018/083967, filed on Apr. 20, 2018, which claims priority to Chinese Patent Application No. 201710459616.9, filed on Jun. 16, 2017. All of the afore-mentioned patent applications are hereby incorporated by reference in their entireties.

TECHNICAL FIELD

This application relates to the field of wireless communications technologies, and in particular, to a channel state information sending method, a channel state information receiving method, and a device.

BACKGROUND

Currently, multiple-input multiple-output (Multiple Input and Multiple Output, MIMO) technologies are widely applied to communications systems, such as a Long Term Evolution LTE) system. In the MIMO technologies, a transmit end and a receive end each use a plurality of transmit antennas and receive antennas, so that signals are sent and received by using the plurality of antennas of the transmit end and the receive end. The MIMO technologies can improve communication quality and a system channel capacity.

In a MIMO system, a precoding technology may be used to improve signal transmission quality and a signal transmission rate. A network device may estimate a precoding matrix for a downlink channel based on channel state information (CSI) fed back by a terminal device, and then the network device uses the precoding matrix to perform downlink transmission with the terminal device. For a high precision codebook-based precoding matrix defined in the LTE standard Release 14 (Rel-14) and a new radio access technology (NR), in a prior-art technical solution used by a terminal device to feed back CSI to a network device, the CSI fed back by the terminal device includes a rank indicator (RI), a precoding matrix indicator (PMI), and a channel quality indicator (CQI) of a channel matrix. The PMI includes a PMI1 and a PMI2, the PMI1 is used to indicate all elements in a matrix $W_1$, the PMI2 is used to indicate all elements in a matrix $W_2$, and a product of $W_1$ and $W_2$ forms a precoding matrix W. In this solution, since $W_2$ is obtained based on a high precision codebook this solution has a problem of requiring a large quantity of bits and high resource overhead required for feeding back the PMI2 corresponding to $W_2$.

As mentioned above, for the high precision codebook-based precoding matrix, the prior-art CSI feedback technical solution has a problem of high resource overhead required for CSI feedback.

SUMMARY

Embodiments of this application provide a channel state information sending method, a channel state information receiving method, and a device, to reduce resource overheads required when a terminal device feeds back CSI to a network device in a scenario of a high precision codebook-based precoding matrix.

According to a first aspect, an embodiment of this application provides a channel state information CSI sending method, including:

determining, by a terminal device, a precoding matrix W, where

W meets a formula $W = W_1 \times W_2$, W is a matrix with $N_t$ rows and L columns, $W_1$ is a matrix with $N_t$ rows and 2I columns, $W_2$ is a matrix with 2I rows and L columns. $N_t$ is a quantity of antenna ports, L is a rank indicated by a rank indicator RI, $N_t$ is greater than or equal to L, and I is an integer greater than or equal to 1; and an element at a location in $i^{th}$ row and an $l^{th}$ column in $W_2$ is $Y_{i,l}$ i is an integer greater than or equal to 0 and less than or equal to 2I−1, l is an integer greater than or equal to 0 and less than or equal to L−1, and $Y_{i,l}$ meets a formula $Y_{i,l} = X_{i,l}^1 \times X_{i,l}^2 \times X_{i,l}^3$, $X_{i,l}^3$ is a complex number with modulus 1;

generating, by the terminal device, CSI that includes the RI, indication information, and a second precoding matrix indicator PMI2; where the indication information is used to indicate that $W_2$ includes N $X_{i,l}^1$ whose values are 0, the PMI2 is used to indicate a parameter of $W_2$, and the parameter of $W_2$ indicated by the PMI2 includes all $X_{i,l}^1$, in $W_2$ and $X_{i,l}^2$ and $X_{i,l}^3$, which are corresponding to $X_{i,l}^1$ other than the N $X_{i,l}^1$ whose values are 0, in $W_2$, and does not include $X_{i,l}^2$ and $X_{i,l}^3$, which are corresponding to the N $X_{i,l}^1$ whose values are 0, in $W_2$; and sending, by the terminal device, a signal including the CSI to a network device.

$X_{i,l}^1$ represents a wideband amplitude, $X_{i,l}^2$ represents a subband amplitude, and $X_{i,l}^3$ represents a phase.

Alternatively, an embodiment of this application provides a channel state information CSI sending method, including:

determining, by a terminal device, a precoding matrix W, where

W meets a formula $W = W_1 \times W_2$, W is a matrix with $N_t$ rows and L columns, $W_1$ is a matrix with $N_t$ rows and 2I columns, $W_2$ is a matrix with 2I rows and L columns. $N_t$ is a quantity of antenna ports, L is a rank indicated by a rank indicator RI, $N_t$ is greater than or equal to L, and I is an integer greater than or equal to 1; and an element at a location in $i^{th}$ row and an $l^{th}$ column in $W_2$ is $Y_{i,l}$, i is an integer greater than or equal to 0 and less than or equal to 2I−1, l is an integer greater than or equal to 0 and less than or equal to L−1, and $Y_{i,l}$ meets a formula $Y_{i,l} = X_{i,l}^1 \times X_{i,l}^3$, $X_{i,l}^3$ is a complex number with modulus 1;

generating, by the terminal device, CSI that includes the RI, indication information, and a second precoding matrix indicator PMI2; where the indication information is used to indicate that $W_2$ includes N $X_{i,l}^1$ whose values are 0, the PMI2 is used to indicate a parameter of $W_2$, and the parameter of $W_2$ indicated by the PMI2 includes all $X_{i,l}^1$ in $W_2$ and $X_{i,l}^3$, corresponding to $X_{i,l}^1$ other than the N $X_{i,l}^1$ whose values are 0, in $W_2$, and does not include $X_{i,l}^3$, corresponding to the N $X_{i,l}^1$ whose values are 0, in $W_2$; and sending, by the terminal device, a signal including the CSI to a network device.

$X_{i,l}^1$ represents a wideband amplitude, and $X_{i,l}^3$ represents a phase.

In the foregoing methods, the CSI that is sent by the terminal device to the network device includes the RI, the indication information, and the PMI2, so that the network device can obtain the PMI2 by using the RI and the indication information, to determine W. In the scenario of a high precision codebook-based precoding matrix, in the prior art, a PMI2 that is sent by a terminal device to a network device needs to indicate a parameter of all elements of $W_2$. However, in the foregoing solutions, the parameter of $W_2$, indicated by the PMI2 that is sent by the terminal device to the network device, is a part of parameters of elements of $W_2$. Therefore, a quantity of bits required by the terminal device to send the PMI2 to the network device is reduced. The indication information is added to the CSI that is sent by the terminal device to the network device, so that the network device can obtain the PMI2 by using the RI and the indication information. Therefore, according to the foregoing methods, resource overheads required by the terminal device to feed back the CSI to the network device can be reduced in the scenario of a high precision codebook-based precoding matrix.

In a possible implementation, that the indication information is used to indicate that $W_2$ includes N $X_{i,l}^1$ whose values are 0 is specifically:

the indication information includes a quantity N of $X_{i,l}^1$ whose values are 0 in all elements of $W_2$; or the indication information includes a quantity $N_l$ of $X_{i,l}^1$ whose values are 0 in all elements of an $l^{th}$ column vector in $W_2$, where l is an integer greater than or equal to 0 and less than or equal to L−1, and $$\sum_{l=0}^{L-1} N_l = N;$$

or the indication information includes a quantity $N_l^0$ of $X_{i,l}^1$ whose values are 0 in first I elements of an $l^{th}$ column vector in $W_2$ and a quantity $N_l^1$ of $X_{i,l}^1$ whose values are 0 in last I elements of the column vector, where l is an integer greater than or equal to 0 and less than or equal to L−1, and $$\sum_{l=0}^{L-1} (N_l^0 + N_l^1) = N;$$

or the indication information includes a quantity N of $X_{i,l}^1$ whose values are 0 in a part of elements of $W_2$; or the indication information includes a quantity $T_l$ of $X_{i,l}^1$ whose values are 0 in a part of elements of an $l^{th}$ column vector in $W_2$, where l is an integer greater than or equal to 0 and less than or equal to L−1, and $$\sum_{l=0}^{L-1} T_l = N.$$

It should be noted that the indication information included in the CSI may be used to indicate that $W_2$ includes N $X_{i,l}^1$ whose values are 0, or the indication information may be used to indicate that $W_2$ includes M $X_{i,l}^1$ whose values are not 0. Because the network device has known a total quantity of $X_{i,l}^1$ included in $W_2$, after receiving the indication information used to indicate that $W_2$ includes M $X_{i,l}^1$ whose values are not 0, the network device can obtain, through calculation based on the indication information and the total quantity of $X_{i,l}^1$ included in $W_2$, that $W_2$ includes N $X_{i,l}^1$ whose values are 0.

In this way, the terminal device can report the indication information to the network device. The indication information may be implemented in a plurality of forms.

In a possible implementation, before the sending, by the terminal device, a signal including the CSI to a network device, the method further includes:

separately encoding, by the terminal device, the indication information and the PMI2, to obtain the signal including the CSI, or separately encoding the RI and the PMI2, to obtain the signal including the CSI.

In other words, neither the indication information and the PMI2 nor the RI and the PMI2 can be encoded together in a joint encoding manner. In this way, it can be ensured that the network device can determine the PMI2 based on the RI and the indication information.

In a possible implementation, before the sending, by the terminal device, a signal including the CSI to a network device, the method further includes:

encoding, by the terminal device, the RI and the indication information in a joint encoding manner, to obtain the signal including the CSI.

The encoding, by the terminal device, the RI and the indication information in a joint encoding manner, to obtain the signal including the CSI may be implemented by using the following two methods:

A first method includes: representing the RI by using Q1 bits, and representing the indication information by using Q2 bits;

combining, by the terminal device, the Q1 bits and the Q2 bits into Q1+Q2 bits; and encoding, by the terminal device, the Q1+Q2 bits, to obtain the signal including the CSI.

A second method includes: selecting, by the terminal device, a status value that is used to indicate combination information of the RI and the indication information; and encoding, by the terminal device, the selected status value, to obtain the signal including the CSI.

In the second method, a quantity of bits required to carry the status value is less than a sum of a quantity of bits required to carry the RI and a quantity of bits required to carry the indication information. Therefore, compared with the method for separately carrying the RI and the indication information by using bits, according to the method for jointly indicating the RI and the indication information by using the status value, a quantity of bits required to indicate the RI and the indication information can be reduced. In this way, resource overheads required by the terminal device to feed back the CSI to the network device are reduced.

In a possible implementation, the CSI further includes:

a first precoding matrix indicator PMI1, where the PMI is used to indicate $W_1$, $W_1$ meets $$W_1 = \begin{bmatrix} X_1 & 0 \\ 0 & X_1 \end{bmatrix},$$

$X_1$ is a matrix with $N_t/2$ rows and I columns, $X_1 = [v_0 \ldots v_{M-1}]$, $v_m$ is a column vector including $N_t/2$ elements, m is an integer greater than or equal to 0 and less than or equal to I−1, and I is an integer greater than or equal to 1.

In this way, after receiving the RI, the PMI1, and the PMI2, the network device can determine W by using the three pieces of information.

According to a second aspect, an embodiment of this application provides a channel state information CSI receiving method, including:

receiving, by a network device, a signal that includes CSI and that is sent by a terminal device, where the CSI includes a rank indicator RI, indication information, and a second precoding matrix indicator PMI2;

obtaining, by the network device, the RI and the indication information based on the signal including the CSI;

obtaining, by the network device, the PMI2 based on the RI and the indication information; and determining, by the network device, a precoding matrix W based on the rank indicator RI and the second precoding matrix indicator PMI2, where W meets a formula $W=W_1 \times W_2$, W is a matrix with $N_t$ rows and L columns, $W_1$ is a matrix with $N_t$ rows and 2I columns, $W_2$ is a matrix with 2I rows and L columns. $N_t$ is a quantity of antenna ports, L is a rank indicated by the RI, $N_t$ is greater than or equal to L, and I is an integer greater than or equal to 1; an element at a location in an $i^{th}$ row and an $l^{th}$ column in $W_2$ is $Y_{i,l}$, i is an integer greater than or equal to 0 and less than or equal to 2I−1, l is an integer greater than or equal to 0 and less than or equal to L−1, and $Y_{i,l}$ meets a formula $Y_{i,l}=X_{i,l}^1 \times X_{i,l}^2 \times X_{i,l}^3$, $X_{i,l}^3$ is a complex number with modulus 1; and the indication information is used to indicate that $W_2$ includes N $X_{i,l}^1$ whose values are 0, the PMI2 is used to indicate a parameter of $W_2$, and the parameter of $W_2$ indicated by the PMI2 includes all $X_{i,l}^1$ in $W_2$ and $X_{i,l}^2$ and $X_{i,l}^3$, which are corresponding to $X_{i,l}^1$ other than the N $X_{i,l}^1$ whose values are 0, in $W_2$, and does not include $X_{i,l}^2$ and $X_{i,l}^3$, which are corresponding to the N $X_{i,l}^1$ whose values are 0, in $W_2$.

$X_{i,l}^1$ represents a wideband amplitude, $X_{i,l}^2$ represents a subband amplitude, and $X_{i,l}^3$ represents a phase.

Alternatively, an embodiment of this application provides a channel state information CSI receiving method, including:

receiving, by a network device, a signal that includes CSI and that is sent by a terminal device, where the CSI includes a rank indicator RI, indication information, and a second precoding matrix indicator PMI2;

obtaining, by the network device, the RI and the indication information based on the signal including the CSI;

obtaining, by the network device, the PMI2 based on the RI and the indication information; and determining, by the network device, a precoding matrix W based on the rank indicator RI and the second precoding matrix indicator PMI2, where W meets a formula $W=W_1 \times W_2$, W is a matrix with $N_t$ rows and L columns, $W_1$ is a matrix with $N_t$ rows and 2I columns, $W_2$ is a matrix with 2I rows and L columns. $N_t$ is a quantity of antenna ports, L is a rank indicated by the RI, $N_t$ is greater than or equal to L, and I is an integer greater than or equal to 1; an element at a location in an $i^{th}$ row and an $l^{th}$ column in $W_2$ is $Y_{i,l}$, i is an integer greater than or equal to 0 and less than or equal to 2I−1, l is an integer greater than or equal to 0 and less than or equal to L−1, $Y_{i,l}$ meets a formula $Y_{i,l}=X_{i,l}^1 \times X_{i,l}^3$, and $X_{i,l}^3$ is a complex number with modulus 1; and the indication information is used to indicate that $W_2$ includes N $X_{i,l}^1$ whose values are 0, the PMI2 is used to indicate a parameter of $W_2$, and the parameter of $W_2$ indicated by the PMI2 includes all $X_{i,l}^1$ in $W_2$ and $X_{i,l}^3$, corresponding to $X_{i,l}^1$ other than the N $X_{i,l}^1$ whose values are 0, in $W_2$, and does not include $X_{i,l}^3$, corresponding to the N $X_{i,l}^1$ whose values are 0, in $W_2$.

$X_{i,l}^1$ represents a wideband amplitude, and $X_{i,l}^3$ represents a phase.

In the foregoing methods, the CSI that is sent by the terminal device and received by the network device includes the RI, the indication information, and the PMI2, so that the network device can obtain the PMI2 by using the RI and the indication information, to determine W. In the scenario of a high precision codebook-based precoding matrix, in the prior art, a PMI2 that is sent by a terminal device to a network device needs to indicate a parameter of all elements of $W_2$. However, in the foregoing solutions, the parameter of $W_2$, indicated by the PMI2 that is sent by the terminal device to the network device, is a part of parameters of elements of $W_2$. Therefore, a quantity of bits required by the terminal device to send the PMI2 to the network device is reduced. The indication information is added to the CSI that is sent by the terminal device to the network device, so that the network device can obtain the PMI2 by using the RI and the indication information. Therefore, according to the foregoing methods, resource overheads required by the terminal device to feed back the CSI to the network device can be reduced in the scenario of a high precision codebook-based precoding matrix.

In a possible implementation, that the indication information is used to indicate that $W_2$ includes N $X_{i,l}^1$ whose values are 0 is specifically:

the indication information includes a quantity N of $X_{i,l}^1$ whose values are 0 in all elements of $W_2$; or the indication information includes a quantity $N_l$ of $X_{i,l}^1$ whose values are 0 in all elements of an $l^{th}$ column vector in $W_2$, where l is an integer greater than or equal to 0 and less than or equal to L−1, and $$\sum_{l=0}^{L-1} N_l = N;$$

or the indication information includes a quantity $N_l^0$ of $X_{i,l}^1$ whose values are 0 in first I elements of an $l^{th}$ column vector in $W_2$ and a quantity $N_l^1$ of $X_{i,l}^1$ whose values are 0 in last I elements of the column vector, where l is an integer greater than or equal to 0 and less than or equal to L−1, and $$\sum_{l=0}^{L-1} (N_l^0 + N_l^1) = N;$$

or the indication information includes a quantity N of $X_{i,l}^1$ whose values are 0 in a part of elements of $W_2$; or the indication information includes a quantity $T_l$ of $X_{i,l}^1$ whose values are 0 in a part of elements of an $l^{th}$ column vector in $W_2$, where l is an integer greater than or equal to 0 and less than or equal to L−1, and $$\sum_{l=0}^{L-1} T_l = N.$$

In a possible implementation, the obtaining, by the network device, the RI and the indication information based on the signal including the CSI includes:

decoding, by the network device, bits that are in the signal including the CSI and that are used to carry the RI and the indication information, to obtain the RI and the indication information; and the obtaining, by the network device, the PMI2 based on the RI and the indication information includes:

decoding, by the network device based on the RI and the indication information, a bit that is in the signal including the CSI and that is used to carry the PMI2, to obtain the PMI2.

In a possible implementation, the decoding, by the network device based on the RI and the indication information, a bit that is in the signal including the CSI and that is used to carry the PMI2, to obtain the PMI2 includes:

determining, by the network device based on the RI and the indication information, a quantity of bits required to decode the PMI2; and decoding, by the network device based on the RI and the quantity of bits, the bit that is used to carry the PMI2, to obtain the PMI2.

In a possible implementation, the decoding, by the network device, bits that include the RI and the indication information and that are in the CSI signal, to obtain the RI and the indication information includes:

decoding, by the network device based on a quantity Q1+Q2 of bits, a signal that includes the RI and the indication information and that is in the CSI signal, to obtain the RI and the indication information, where the RI is represented by using Q1 bits, and the indication information is represented by using Q2 bits.

In a possible implementation, the decoding, by the network device, bits that are in the signal including the CSI and that are used to carry the RI and the indication information, to obtain the RI and the indication information includes:

obtaining, by the network device, a status value based on the bits that are used to carry the RI and the indication information, where the status value is used to indicate combination information of the RI and the indication information; and obtaining, by the network device, the RI and the indication information based on the status value.

In a possible implementation, the CSI further includes:

a first precoding matrix indicator PMI1, where the PMI is used to indicate $W_1$, $W_1$ meets $$W_1 = \begin{bmatrix} X_1 & 0 \\ 0 & X_1 \end{bmatrix},$$

$X_1$ is a matrix with $N_t/2$ rows and I columns, $X_1=[v_0 \ldots v_{M-1}]$, $v_m$ is a column vector including $N_t/2$ elements, m is an integer greater than or equal to 0 and less than or equal to I−1, and I is an integer greater than or equal to 1; and the determining, by the network device, W based on the RI and the PMI2 includes:

determining, by the network device, W based on the RI, the PMI1 and the PMI2.

According to a third aspect, an embodiment of this application provides a terminal device, including:

a processing unit, configured to determine a precoding matrix W, where

W meets a formula $W=W_1 \times W_2$, W is a matrix with $N_t$ rows and L columns, $W_1$ is a matrix with $N_t$ rows and 2I columns, $W_2$ is a matrix with 2I rows and L columns. $N_t$ is a quantity of antenna ports, L is a rank indicated by a rank indicator RI, $N_t$ is greater than or equal to L, and I is an integer greater than or equal to 1; an element at a location in an $i^{th}$ row and an $l^{th}$ column in $W_2$ is $Y_{i,l}$, i is an integer greater than or equal to 0 and less than or equal to 2I−1, l is an integer greater than or equal to 0 and less than or equal to L−1, and $Y_{i,l}$ meets a formula $Y_{i,l}=X_{i,l}^1 \times X_{i,l}^2 \times X_{i,l}^3$, $X_{i,l}^3$ is a complex number with modulus 1;

the processing unit is further configured to generate CSI that includes the RI, indication information, and a second precoding matrix indicator PMI2; and the indication information is used to indicate that $W_2$ includes N $X_{i,l}^1$ whose values are 0, the PMI2 is used to indicate a parameter of $W_2$, and the parameter of $W_2$ indicated by the PMI2 includes all $X_{i,l}^1$ in $W_2$ and $X_{i,l}^2$ and $X_{i,l}^3$, which are corresponding to $X_{i,l}^1$ other than the N $X_{i,l}^1$ whose values are 0, in $W_2$, and does not include $X_{i,l}^2$ and $X_{i,l}^3$, which are corresponding to the N $X_{i,l}^1$ whose values are 0, in $W_2$; and a transceiver unit, configured to send a signal including the CSI to a network device.

$X_{i,l}^1$ represents a wideband amplitude, $X_{i,l}^2$ represents a subband amplitude, and $X_{i,l}^3$ represents a phase.

Alternatively, an embodiment of this application provides a terminal device, including:

a processing unit, configured to determine a precoding matrix W, where

W meets a formula $W=W_1 \times W_2$, W is a matrix with $N_t$ rows and L columns, $W_1$ is a matrix with $N_t$ rows and 2I columns, $W_2$ is a matrix with 2I rows and L columns. $N_t$ is a quantity of antenna ports, L is a rank indicated by a rank indicator RI, $N_t$ is greater than or equal to L, and I is an integer greater than or equal to 1; an element at a location in an $i^{th}$ row and an $l^{th}$ column in $W_2$ is $Y_{i,l}$, i is an integer greater than or equal to 0 and less than or equal to 2I−1, l is an integer greater than or equal to 0 and less than or equal to L−1, and $Y_{i,l}$ meets a formula $Y_{i,l}=X_{i,l}^1 \times X_{i,l}^3$, $X_{i,l}^3$, is a complex number with modulus 1;

the processing unit is further configured to generate CSI that includes the RI, indication information, and a second precoding matrix indicator PMI2; and the indication information is used to indicate that $W_2$ includes N $X_{i,l}^1$ whose values are 0, the PMI2 is used to indicate a parameter of $W_2$, and the parameter of $W_2$ indicated by the PMI2 includes all $X_{i,l}^1$ in $W_2$ and $X_{i,l}^3$, corresponding to $X_{i,l}^1$ other than the N $X_{i,l}^1$ whose values are 0, in $W_2$, and does not include $X_{i,l}^3$, corresponding to the N $X_{i,l}^1$ whose values are 0, in $W_2$; and a transceiver unit, configured to send a signal including the CSI to a network device.

$X_{i,l}^1$ represents a wideband amplitude, and $X_{i,l}^3$ represents a phase.

In a possible implementation, that the indication information is used to indicate that $W_2$ includes N $X_{i,l}^1$ whose values are 0 is specifically:

the indication information includes a quantity N of $X_{i,l}^1$ whose values are 0 in all elements of $W_2$; or the indication information includes a quantity $N_1$ of $X_{i,l}^1$ whose values are 0 in all elements of an $l^{th}$ column vector in $W_2$, where l is an integer greater than or equal to 0 and less than or equal to L−1, and $$\sum_{l=0}^{L-1} N_l = N;$$

or the indication information includes a quantity $N_l^0$ of $X_{i,l}^1$ whose values are 0 in first l elements of an $l^{th}$ column vector in $W_2$ and a quantity $N_l^1$ of $X_{i,l}^1$ whose values are 0 in last l elements of the column vector, where l is an integer greater than or equal to 0 and less than or equal to L-1, and $$\sum_{l=0}^{L-1}(N_l^0+N_l^1)=N;$$

or the indication information includes a quantity N of $X_{i,l}^1$ whose values are 0 in a part of elements of $W_2$; or the indication information includes a quantity $T_l$ of $X_{i,l}^1$ whose values are 0 in a part of elements of an $l^{th}$ column vector in $W_2$, where l is an integer greater than or equal to 0 and less than or equal to L-1, and $$\sum_{l=0}^{L-1}T_l=N.$$

In a possible implementation, the processing unit is further configured to:

before the transceiver unit sends the signal including the CSI to the network device, separately encode the indication information and the PMI2, to obtain the signal including the CSI.

In a possible implementation, the processing unit is further configured to:

before the transceiver unit sends the signal including the CSI to the network device, encode the RI and the indication information in a joint encoding manner, to obtain the signal including the CSI.

In a possible implementation, when encoding the RI and the indication information in the joint encoding manner, to obtain the signal including the CSI, the processing unit is specifically configured to:

represent the RI by using Q1 bits, and represent the indication information by using Q2 bits;

combine the Q1 bits and the Q2 bits into Q1+Q2 bits; and encode the Q1+Q2 bits, to obtain the signal including the CSI.

In a possible implementation, when encoding the RI and the indication information in the joint encoding manner, to obtain the signal including the CSI, the processing unit is specifically configured to:

select a status value that is used to indicate combination information of the RI and the indication information; and encode the selected status value, to obtain the signal including the CSI.

In a possible implementation, the CSI further includes:

a first precoding matrix indicator PMI1, where the PMI is used to indicate $W_1$, $W_1$ meets $$W_1=\begin{bmatrix}X_1 & 0\\ 0 & X_1\end{bmatrix},$$

$X_1$ is a matrix with $N_t/2$ rows and I columns, $X_1=[v_0 \ldots v_{M-1}]$, $v_m$ is a column vector including $N_t/2$ elements, m is an integer greater than or equal to 0 and less than or equal to I-1, and I is an integer greater than or equal to 1.

According to a fourth aspect, an embodiment of this application provides a network device, including:

a transceiver unit, configured to receive a signal that includes CSI and that is sent by a terminal device, where the CSI includes a rank indicator RI, indication information, and a second precoding matrix indicator PMI2; and a processing unit, configured to obtain the RI and the indication information based on the signal including the CSI; obtain the PMI2 based on the RI and the indication information; and determine a precoding matrix W based on the rank indicator RI and the second precoding matrix indicator PMI2, where W meets a formula $W=W_1\times W_2$, W is a matrix with $N_t$ rows and L columns, $W_1$ is a matrix with $N_t$ rows and 2I columns, $W_2$ is a matrix with 2I rows and L columns, $N_t$ is a quantity of antenna ports, L is a rank indicated by the RI, $N_t$ is greater than or equal to L, and I is an integer greater than or equal to 1; an element at a location in an $i^{th}$ row and an $l^{th}$ column in $W_2$ is $Y_{i,l}$, i is an integer greater than or equal to 0 and less than or equal to 2I-1, l is an integer greater than or equal to 0 and less than or equal to L-1, and $Y_{i,l}$ meets a formula $Y_{i,l}=X_{i,l}^1\times X_{i,l}^2\times X_{i,l}^3$, and $X_{i,l}^3$ is a complex number with modulus 1; and the indication information is used to indicate that $W_2$ includes N $X_{i,l}^1$ whose values are 0, the PMI2 is used to indicate a parameter of $W_2$, and the parameter of $W_2$ indicated by the PMI2 includes all $X_{i,l}^1$ in $W_2$ and $X_{i,l}^2$ and $X_{i,l}^3$, which are corresponding to $X_{i,l}^1$ other than the N $X_{i,l}^1$ whose values are 0, in $W_2$, and does not include $X_{i,l}^2$ and $X_{i,l}^3$, which are corresponding to the N $X_{i,l}^1$ whose values are 0, in $W_2$.

$X_{i,l}^1$ represents a wideband amplitude, $X_{i,l}^2$ represents a subband amplitude, and $X_{i,l}^3$ represents a phase.

Alternatively, an embodiment of this application provides a network device, including:

a transceiver unit, configured to receive a signal that includes CSI and that is sent by a terminal device, where the CSI includes a rank indicator RI, indication information, and a second precoding matrix indicator PMI2; and a processing unit, configured to obtain the RI and the indication information based on the signal including the CSI; obtain the PMI2 based on the RI and the indication information; and determine a precoding matrix W based on the rank indicator RI and the second precoding matrix indicator PMI2, where W meets a formula $W=W_1\times W_2$, W is a matrix with $N_t$ rows and L columns, $W_1$ is a matrix with $N_t$ rows and 2I columns, $W_2$ is a matrix with 2I rows and L columns, $N_t$ is a quantity of antenna ports, L is a rank indicated by the RI, $N_t$ is greater than or equal to L, and I is an integer greater than or equal to 1; an element at a location in an $i^{th}$ row and an $l^{th}$ column in $W_2$ is $Y_{i,l}$, i is an integer greater than or equal to 0 and less than or equal to 2I-1, l is an integer greater than or equal to 0 and less than or equal to L-1, and $Y_{i,l}$ meets a formula $Y_{i,l}=X_{i,l}^1\times X_{i,l}^3$, $X_{i,l}^3$ is a complex number with modulus 1; and the indication information is used to indicate that $W_2$ includes N $X_{i,l}^1$ whose values are 0, the PMI2 is used to indicate a parameter of $W_2$, and the parameter of $W_2$ indicated by the PMI2 includes all $X_{i,l}^1$ in $W_2$ and $X_{i,l}^3$, corresponding to $X_{i,l}^1$ other than the N $X_{i,l}^1$ whose values are 0, in $W_2$, and does not include $X_{i,l}^3$, corresponding to the N $X_{i,l}^1$ whose values are 0, in $W_2$.

In a possible implementation, $X_{i,l}^1$ represents a wideband amplitude, and $X_{i,l}^3$ represents a phase.

In a possible implementation, that the indication information is used to indicate that $W_2$ includes N $X_{i,l}^1$ whose values are 0 is specifically:

the indication information includes a quantity N of $X_{i,l}^1$ whose values are 0 in all elements of $W_2$; or the indication information includes a quantity $N_l$ of $X_{i,l}^1$ whose values are 0 in all elements of an $l^{th}$ column vector in $W_2$, where l is an integer greater than or equal to 0 and less than or equal to L−1, and $$\sum_{l=0}^{L-1} N_l = N;$$

or the indication information includes a quantity $N_l^0$ of $X_{i,l}^1$ whose values are 0 in first I elements of an $l^{th}$ column vector in $W_2$ and a quantity $N_l^1$ of $X_{i,l}^1$ whose values are 0 in last I elements of the column vector, where l is an integer greater than or equal to 0 and less than or equal to L−1, and $$\sum_{l=0}^{L-1} (N_l^0 + N_l^1) = N;$$

or the indication information includes a quantity N of $X_{i,l}^1$ whose values are 0 in a part of elements of $W_2$; or the indication information includes a quantity $T_l$ of $X_{i,l}^1$ whose values are 0 in a part of elements of an $l^{th}$ column vector in $W_2$, where l is an integer greater than or equal to 0 and less than or equal to L−1, and $$\sum_{l=0}^{L-1} T_l = N.$$

In a possible implementation, when obtaining the RI and the indication information based on the signal including the CSI, the processing unit is specifically configured to:

decode bits that are in the signal including the CSI and that are used to carry the RI and the indication information, to obtain the RI and the indication information; and when obtaining the PMI2 based on the RI and the indication information, the processing unit is specifically configured to:

decode, based on the RI and the indication information, a bit that is in the signal including the CSI and that is used to carry the PMI2, to obtain the PMI2.

In a possible implementation, when decoding, based on the RI and the indication information, the bit that is in the signal including the CSI and that is used to carry the PMI2, to obtain the PMI2, the processing unit is specifically configured to:

determine, based on the RI and the indication information, a quantity of bits required to decode the PMI2; and decode, based on the RI and the quantity of bits, the bit that is used to carry the PMI2, to obtain the PMI2.

In a possible implementation, when decoding the bits that include the RI and the indication information and that are in the CSI signal, to obtain the RI and the indication information, the processing unit is specifically configured to:

decode, based on a quantity Q1+Q2 of bits, a signal that includes the RI and the indication information and that is in the CSI signal, to obtain the RI and the indication information, where the RI is represented by using Q1 bits, and the indication information is represented by using Q2 bits.

In a possible implementation, when decoding the bits that are in the signal including the CSI and that are used to carry the RI and the indication information, to obtain the RI and the indication information, the processing unit is specifically configured to:

obtain a status value based on the bits that are used to carry the RI and the indication information, where the status value is used to indicate combination information of the RI and the indication information; and obtain the RI and the indication information based on the status value.

In a possible implementation, the CSI further includes:

a first precoding matrix indicator PMI1, where the PMI is used to indicate $W_1$, $W_1$ meets $$W_1 = \begin{bmatrix} X_1 & 0 \\ 0 & X_1 \end{bmatrix},$$

$X_1$ is a matrix with $N_t/2$ rows and I columns, $X_1 = [v_0 \ldots v_{M-1}]$, $v_m$ is a column vector including $N_t/2$ elements, m is an integer greater than or equal to 0 and less than or equal to I−1, and I is an integer greater than or equal to 1; and when determining W based on the RI and the PMI2, the processing unit is specifically configured to:

determine W based on the RI, the PMI1, and the PMI2.

According to a fifth aspect, an embodiment of this application further provides a terminal device, where the terminal device has functions of implementing actions of the terminal device in the method example of the first aspect. The functions may be implemented by using hardware. A structure of the terminal device includes a memory, a processor, and a transceiver; the memory is configured to store a computer-readable program; the processor invokes an instruction stored in the memory, to perform the method according to any one of the implementations of the first aspect, to implement a function of the processing unit included in the structure of the terminal device in the third aspect; and the transceiver is configured to receive and/or send data under control of the processor, to implement a function of the transceiver unit included in the structure of the terminal device in the third aspect.

According to a sixth aspect, an embodiment of this application further provides a computer storage medium, where the storage medium stores a software program, and when being read and executed by one or more processors, the software program is capable of implementing the method according to the first aspect or any one of the implementations of the first aspect.

According to a seventh aspect, an embodiment of this application further provides a network device, where the network device has functions of implementing actions of the network device in the method example of the second aspect. The functions may be implemented by using hardware. A structure of the network device includes a memory, a processor, and a transceiver; the memory is configured to store a computer-readable program; the processor invokes an instruction stored in the memory, to perform the method according to any one of the implementations of the second aspect, to implement a function of the processing unit included in the structure of the network device in the fourth aspect; and the transceiver is configured to receive and/or send data under control of the processor, to implement a function of the transceiver unit included in the structure of the network device in the fourth aspect.

According to an eighth aspect, an embodiment of this application further provides a computer storage medium, where the storage medium stores a software program, and when being read and executed by one or more processors, the software program is capable of implementing the method according to the second aspect or any one of the implementations of the second aspect.

According to a ninth aspect, an embodiment of this application further provides a communications system. The communications system includes a terminal device and a network device. The terminal device is configured to perform the method according to the first aspect or any one of the implementations of the first aspect, and the network device is configured to perform the method according to the second aspect or any one of the implementations of the second aspect.

According to the technical solutions provided in the embodiments of this application, resource overheads required by the terminal device to feed back the CSI to the network device can be reduced in the scenario of a high precision codebook-based precoding matrix.

DESCRIPTION OF EMBODIMENTS

Figure 1:
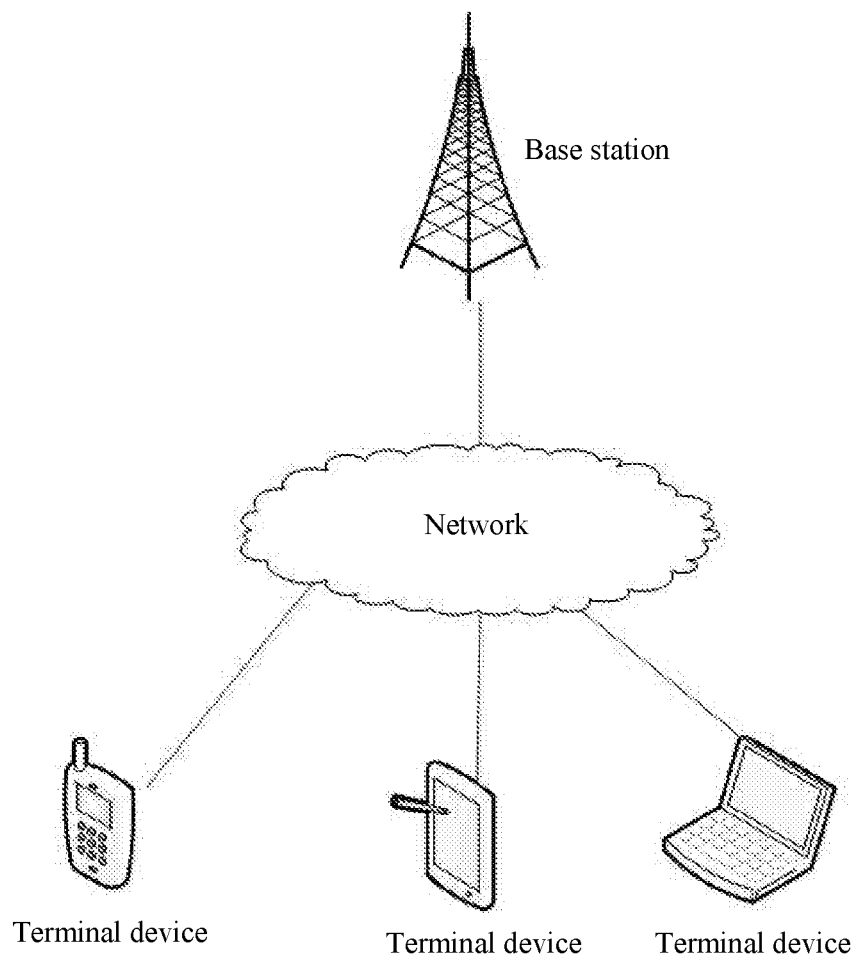
FIG. 1 is a schematic architectural diagram of an NR system in an embodiment of this application.

Embodiments of this application provide a channel state information sending method, a channel state information receiving method, and a device, to reduce resource overhead required when a terminal device feeds back CSI to a network device in a scenario of a high precision codebook-based precoding matrix. The methods and the device are based on a same invention concept. Because principles of resolving problems according to the methods and the device are similar, mutual reference may be made to implementations of the device and the methods, and repeated content is not described.

The technical solutions provided in the embodiments of this application are applicable to a wireless communications system that applies MIMO technologies, such as an LTE system or an NR system and the like. In the MIMO technologies, a transmit end and a receive end each use a plurality of transmit antennas and receive antennas, so that signals are sent and received by using the plurality of antennas of the transmit end and the receive end, thereby improving communication quality. According to the MIMO technologies, spatial resources can be utilized well, multiple-transmit multiple-receive is implemented by using a plurality of antennas, and a system channel capacity is multiplied without adding spectrum resources or increasing antenna transmit power.

In a MIMO system, if a network device can obtain all or a part of downlink channel information, a precoding technology can be used to improve signal transmission quality and increase a signal transmission rate. The technical solutions provided in the embodiments of this application are applicable to a scenario in which a terminal device feeds back CSI to a network device and the network device estimates a precoding matrix for a downlink channel based on the CSI. In this scenario, the terminal device measures the downlink channel based on a common reference signal (Common Reference Signal, CRS), to obtain a channel matrix; and the terminal device may select, from a preset codebook according to an optimization rule, a precoding matrix that best matches the downlink channel, and further determines a precoding matrix indicator PMI, and feed back the PMI to the network device as CSI. The terminal device may further determine, based on the determined PMI, a channel quality achieved after the PMI is used, i.e., a channel quality indicator CQI. The CQI is also fed back to the network device as the CSI. The following describes the precoding matrix used in the embodiments of this application.

In design of a communications system, a codebook may include a plurality of precoding matrices, and content of the codebook is known to both of a transmitter and a receiver.

In the embodiments of this application, if a complex number represents a phase, and the complex number is a complex number with modulus 1, multiplying the complex number and another complex number (for example, a complex number A) would only change the phase of the complex number A but the amplitude of the complex number A is unchanged.

The precoding matrix in the embodiments of this application is for a high precision codebook-based precoding matrix defined in the standard LTE system release 14 and an NR system. The precoding matrix uses a dual-stage codebook feedback mechanism to reduce feedback load. To be specific, a precoding matrix (or referred to as a precoding vector) W is a product of a first-stage feedback matrix $W_1$ and a second-stage feedback matrix $W_2$. W may be represented by Formula 1:

$$W = W_1 \times W_2 \qquad \text{Formula 1}$$

In Formula 1, W is a matrix with $N_t$ rows and L columns, $N_t$ is the quantity of antenna ports, L is a rank of a channel matrix, i.e., a rank indicated by RI, and $N_t$ is greater than or equal to L. $W_1$ is a block diagonal matrix with $N_t$ rows and 2I columns, I is an integer greater than or equal to 1 and may represent the quantity of beam vectors included in each diagonal matrix of $W_1$, and $W_1$ may be represented by Formula 2:

$$W_1 = \begin{bmatrix} X_1 & 0 \\ 0 & X_1 \end{bmatrix} \qquad \text{Formula 2}$$

In Formula 2, $X_1$ is a matrix with $N_t/2$ rows and I columns, $X_1$ meets $X_1=[v_0 \ldots v_{M-1}]$, $v_m$ is a column vector including $N_t/2$ elements, $v_m$ represents a beam vector, m is an integer greater than or equal to 0 and less than or equal to I−1, and I is an integer greater than or equal to 1.

In Formula 1, $W_2$ is a matrix with 2I rows and L columns, I is an integer greater than 1, L is the rank of the channel matrix, i.e., the rank indicated by RI, and an element $Y_{i,l}$ at a location in an $i^{th}$ row and an $l^{th}$ column in $W_2$ may be represented by two formulas.

First case: The element $Y_{i,l}$ at the location in the $i^{th}$ row and the $l^{th}$ column in $W_2$ meets Formula 3:

$$Y_{i,l} = X_{i,l}^1 \times X_{i,l}^2 \times X_{i,l}^3 \quad \text{Formula 3}$$

In Formula 3, i is an integer greater than or equal to 0 and less than or equal to 2I−1, l is an integer greater than or equal to 0 and less than or equal to L−1, $X_{i,l}^1$ represents a wideband amplitude of a channel, $X_{i,l}^2$ represents a subband amplitude of the channel, $X_{i,l}^3$ represents a phase of the channel, and $X_{i,l}^3$ is a complex number with modulus 1. When $Y_{i,l}^2$ meets Formula 3, $X_{i,l}^1$ in $Y_{i,l}$ which is at any location in $W_2$ corresponds to $X_{i,l}^2$ and $X_{i,l}^3$ in $Y_{i,l}$. For $X_{i,l}^1$, $X_{i,l}^2$, and $X_{i,l}^3$ that have a correspondence, a value of $X_{i,l}^1$ may determine a value of $X_{i,l}^2$ and a value of $X_{i,l}^3$. When the value of $X_{i,l}^1$ is 0, the value of $X_{i,l}^2$ corresponding to $X_{i,l}^1$ is 0, and the value of $X_{i,l}^3$ corresponding to $X_{i,l}^1$ is also 0. For example, in an element $Y_{2,1} = X_{2,1}^1 \times X_{2,1}^2 \times X_{2,1}^3$ at a location in a $2^{nd}$ row and a $1^{st}$ column in $W_2$, $X_{2,1}^1$ corresponds to $X_{2,1}^2$ and $X_{2,1}^3$. When a value of $X_{2,1}^1$ is 0, $Y_{2,1}=0$. A value of $X_{2,1}^2$ corresponding to $X_{2,1}^1$ does not affect a value of $Y_{2,1}$, and a value of $X_{2,1}^3$ corresponding to $X_{2,1}^1$ does not affect the value of $Y_{2,1}$, either. When $Y_{i,l}$ meets Formula 3, $W_2$ may be represented by the following two formulas.

When the rank is 1, $W_2$ may be represented by Formula 4:

$$W_2 = \begin{bmatrix} p_{0,0,0}^{(WB)} \cdot p_{0,0,0}^{(SB)} \cdot c_{0,0,0} \\ p_{0,0,1}^{(WB)} \cdot p_{0,0,1}^{(SB)} \cdot c_{0,0,1} \\ \vdots \\ p_{0,0,I-1}^{(WB)} \cdot p_{0,0,I-1}^{(SB)} \cdot c_{0,0,I-1} \\ p_{1,0,0}^{(WB)} \cdot p_{1,0,0}^{(SB)} \cdot c_{1,0,0} \\ p_{1,0,1}^{(WB)} \cdot p_{1,0,1}^{(SB)} \cdot c_{1,0,1} \\ \vdots \\ p_{1,0,I-1}^{(WB)} \cdot p_{1,0,I-1}^{(SB)} \cdot c_{1,0,I-1} \end{bmatrix} \quad \text{Formula 4}$$

When the rank is 2, $W_2$ may be represented by Formula 5:

$$W_2 = \begin{bmatrix} p_{0,0,0}^{(WB)} \cdot p_{0,0,0}^{(SB)} \cdot c_{0,0,0} & p_{0,1,0}^{(WB)} \cdot p_{0,1,0}^{(SB)} \cdot c_{0,1,0} \\ p_{0,0,1}^{(WB)} \cdot p_{0,0,1}^{(SB)} \cdot c_{0,0,1} & p_{0,1,1}^{(WB)} \cdot p_{0,1,1}^{(SB)} \cdot c_{0,1,1} \\ \vdots & \vdots \\ p_{0,0,I-1}^{(WB)} \cdot p_{0,0,I-1}^{(SB)} \cdot c_{0,0,I-1} & p_{0,1,I-1}^{(WB)} \cdot p_{0,1,I-1}^{(SB)} \cdot c_{0,1,I-1} \\ p_{1,0,0}^{(WB)} \cdot p_{1,0,0}^{(SB)} \cdot c_{1,0,0} & p_{1,1,0}^{(WB)} \cdot p_{1,1,0}^{(SB)} \cdot c_{1,1,0} \\ p_{1,0,1}^{(WB)} \cdot p_{1,0,1}^{(SB)} \cdot c_{1,0,1} & p_{1,1,0}^{(WB)} \cdot p_{1,1,0}^{(SB)} \cdot c_{1,1,1} \\ \vdots & \vdots \\ p_{1,0,I-1}^{(WB)} \cdot p_{1,0,I-1}^{(SB)} \cdot c_{1,0,I-1} & p_{1,1,I-1}^{(WB)} \cdot p_{1,1,I-1}^{(SB)} \cdot c_{1,1,I-1} \end{bmatrix} \quad \text{Formula 5}$$

In Formula 4 and Formula 5, an element at any location in $W_2$ may be represented as $p_{r,l,m}^{(WB)} \cdot p_{r,l,m}^{(SB)} \cdot c_{r,l,m}$. $p_{r,l,m}^{(WB)}$ represents $X_{i,l}^1$, the wideband amplitude of the channel, and $p_{r,l,m}^{(WB)} \in \{1, \sqrt{0.5}, \sqrt{0.25}, \sqrt{0.125}, \sqrt{0.0625}, \sqrt{0.0313}, \sqrt{0.0313}, \sqrt{0.0156}, 0\}$; $p_{r,l,m}^{(SB)}$ represents $X_{i,l}^2$, the subband amplitude of the channel, and $p_{r,l,m}^{(SB)} \in \{1, \sqrt{0.5}\}$; and $c_{r,l,m}$ represents $X_{i,l}^3$, the phase of the channel, and $$c_{r,l,m} \in \left\{ e^{j\frac{n}{2}\pi}, n=0,1,2,3 \right\} \text{ or } c_{r,l,m} \in \left\{ e^{j\frac{n}{2}\pi}, n=0,1,2,3,\cdots,7 \right\}.$$

r represents an indicator of an antenna polarization direction dimension, l represents a sequence number of a data layer, and i represents a sequence number of a beam vector $b_i^m$ in $W_1$.

Second case: The element $Y_{i,l}$ at the location in the $i^{th}$ row and the $l^{th}$ column in $W_2$ meets Formula 6:

$$Y_{i,l} = X_{i,l}^1 \times X_{i,l}^3 \quad \text{Formula 6}$$

In Formula 6, i is an integer greater than 0 and less than 2I−1, l is an integer greater than 0 and less than L−1, $X_{i,l}^1$ represents a wideband amplitude of a channel, $X_{i,l}^3$ represents a phase of the channel, and $X_{i,l}^3$ is a complex number with modulus 1. When $Y_{i,l}$ meets Formula 6, $X_{i,l}^1$ in $Y_{i,l}$ which is at any location in $W_2$ corresponds to $X_{i,l}^3$ in $Y_{i,l}$. For $X_{i,l}^1$ and $X_{i,l}^3$ that have a correspondence, a value of $X_{i,l}^1$ may determine a value of $X_{i,l}^3$. When the value of $X_{i,l}^1$ is 0, the value of $X_{i,l}^3$ corresponding to $X_{i,l}^1$ is 0. For example, in an element $Y_{2,1} = X_{2,1}^1 \times X_{2,1}^3$ at a location in a $2^{nd}$ row and a $1^{st}$ column in $W_2$, when a value of $X_{2,1}^1$ is 0, $Y_{2,1}=0$. A value of $X_{2,1}^3$ corresponding to $X_{2,1}^1$ does not affect a value of $Y_{2,1}$. When $Y_{i,l}$ meets Formula 6, $W_2$ may be represented by the following two formulas.

When the rank is 1, $W_2$ may be represented by Formula 7:

$$W_2 = \begin{bmatrix} p_{0,0,0}^{(WB)} \cdot c_{0,0,0} \\ p_{0,0,1}^{(WB)} \cdot c_{0,0,1} \\ \vdots \\ p_{0,0,I-1}^{(WB)} \cdot c_{0,0,I-1} \\ p_{1,0,0}^{(WB)} \cdot c_{1,0,0} \\ p_{1,0,1}^{(WB)} \cdot c_{1,0,1} \\ \vdots \\ p_{1,0,I-1}^{(WB)} \cdot c_{1,0,I-1} \end{bmatrix} \quad \text{Formula 7}$$

When the rank is 2, $W_2$ may be represented by Formula 8:

$$W_2 = \begin{bmatrix} p_{0,0,0}^{(WB)} \cdot c_{0,0,0} & p_{0,1,0}^{(WB)} \cdot c_{0,1,0} \\ p_{0,0,1}^{(WB)} \cdot c_{0,0,1} & p_{0,1,1}^{(WB)} \cdot c_{0,1,1} \\ \vdots & \vdots \\ p_{0,0,I-1}^{(WB)} \cdot c_{0,0,I-1} & p_{0,1,I-1}^{(WB)} \cdot c_{0,1,I-1} \\ p_{1,0,0}^{(WB)} \cdot c_{1,0,0} & p_{1,1,0}^{(WB)} \cdot c_{1,1,0} \\ p_{1,0,1}^{(WB)} \cdot c_{1,0,1} & p_{1,1,0}^{(WB)} \cdot c_{1,1,0} \\ \vdots & \vdots \\ p_{1,0,I-1}^{(WB)} \cdot c_{1,0,I-1} & p_{1,1,I-1}^{(WB)} \cdot c_{1,1,I-1} \end{bmatrix} \quad \text{Formula 8}$$

In Formula 7 and Formula 8, an element at any location in $W_2$ may be represented as $p_{r,l,m}^{(WB)} \cdot c_{r,l,m}$. $p_{r,l,m}^{(WB)}$ represents $X_{i,l}^1$, the wideband amplitude of the channel, and $p_{r,l,m}^{(WB)} \in \{1, \sqrt{0.5} \sqrt{0.25} \sqrt{0.125} \sqrt{0.0625} \sqrt{0.0313} \sqrt{0.0313} \sqrt{0.0156}\ 0\}$; and $c_{r,l,m}$ represents $X_{i,l}^3$, the phase of the channel, and $$c_{r,1,m} \in \{e^{j\frac{n}{2}\pi}, n=0,1,2,3\} \text{ or } c_{r,1,m} \in \{e^{j\frac{n}{2}\pi}, n=0,1,2,3,\cdots,7\}.$$

r represents an indicator of an antenna polarization direction dimension, l represents a sequence number of a data layer, and i represents a sequence number of a beam vector $b_i^m$ in $W_1$.

The technical solutions provided in the embodiments of this application may be used in an NR system. For an architectural diagram of the NR system, refer to FIG. 1. The NR system includes at least one network device, and at least one terminal device connected to each network device. The technical solutions provided in the embodiments of this application relate to the terminal device and the network device.

The terminal device may be a device that provides voice and/or data connectivity to a user, a handheld device having a wireless connection function, or another processing device connected to a wireless modem. The wireless terminal device may communicate with one or more core networks through a RAN. The wireless terminal device may be a mobile terminal device, such as a mobile phone (also referred to as a "cellular" phone) or a computer with a mobile terminal device. For example, the wireless terminal device may be a portable, pocket-sized, handheld, computer built-in, or in-vehicle mobile apparatus, and exchanges voice and/or data with a radio access network. For example, the wireless terminal device may be a device such as a personal communications service (PCS) phone, a cordless telephone set, a Session Initiation Protocol (SIP) phone, a wireless local loop (WLL) station, or a personal digital assistant (PDA). The wireless terminal device may also be referred to as a system, a subscriber unit, a subscriber station, a mobile station, a mobile console (Mobile), a remote station, an access point, a remote terminal device, an access terminal device, a user terminal device, a user agent, a user device, or user equipment.

The network device may be a base station or an access point, or may be a device that communicates with a wireless terminal device over an air interface in an access network by using one or more sectors. The network device may be configured to perform mutual conversion between a received over-the-air frame and an Internet Protocol (Internet Protocol, IP) packet, and serve as a router between the wireless terminal device and a rest portion of the access network. The rest portion of the access network may include an Internet Protocol (IP) network. The network device may further coordinate management of an air interface attribute. For example, the network device may be a network device (BTS, Base Transceiver Station) in a Global System for Mobile Communications (GSM) or Code Division Multiple Access (CDMA), a network device (NodeB) in Wideband Code Division Multiple Access (WCDMA), or an evolved network device (evolutional Node B, eNB or e-NodeB) in LTE. This is not limited in the embodiments of the present invention.

The following describes the technical solutions provided in the embodiments of this application.

Figure 2:
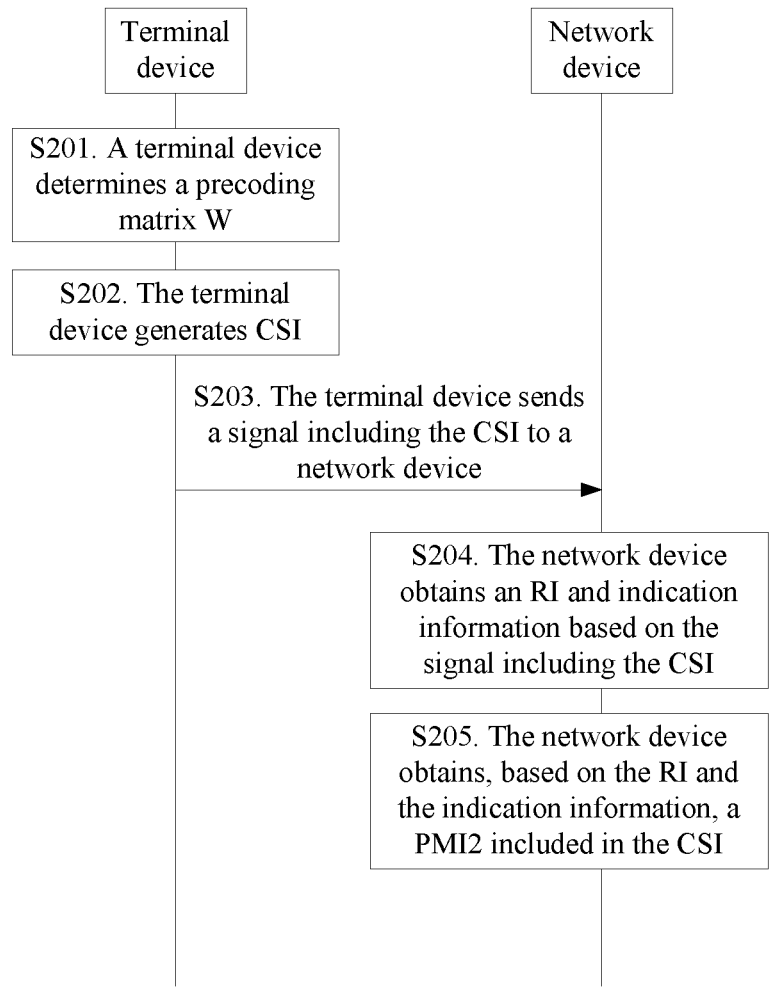
FIG. 2 is a schematic flowchart of a channel state information sending, receiving method according to an embodiment of this application.

An embodiment of this application provides a channel state information sending and receiving method. As shown in FIG. 2, the method includes the following steps.

S201. A terminal device determines a precoding matrix W.

W meets a formula $W=W_1 \times W_2$, W is a matrix with $N_t$ rows and L columns, $W_1$ is a matrix with $N_t$ rows and 2I columns, $W_2$ is a matrix with 2I rows and L columns. $N_t$ is a quantity of antenna ports, L is a rank indicated by a rank indicator RI, $N_t$ is greater than or equal to L, and I is an integer greater than or equal to 1; and an element at a location in an $i^{th}$ row and an $l^{th}$ column in $W_2$ is $Y_{i,l}$, i is an integer greater than or equal to 0 and less than or equal to 2I−1, l is an integer greater than or equal to 0 and less than or equal to L−1, and $Y_{i,l}$ meets a formula, $Y_{i,l}=X_{i,l}^1 \times X_{i,l}^2 \times X_{i,l}^3$, or $Y_{i,l}=X_{i,l}^1 \times X_{i,l}^2$, $X_{i,l}^3$ is a complex number with modulus 1. For detailed descriptions about W, $W_1$, and $W_2$, refer to the foregoing description. Details are not repeatedly described herein.

A method for determining W by the terminal device in S201 includes: determining, by the terminal device, a physical channel based on a channel state information-reference signal CSI-RS delivered by a network device, and then determining, based on the physical channel, W from a predefined precoding matrix group. A principle for determining W may be: if the network device performs weighting on data based on the precoding matrix W, a signal-to-noise ratio, a throughput, or spectrum efficiency for data received by the terminal device is the highest.

S202. The terminal device generates CSI that includes an RI, indication information, and a second precoding matrix indicator PMI2.

The RI is an indicator of a rank of a channel matrix, and the RI is used by the terminal device to report, to the network device, the layer quantity of data that can be carried by the physical channel. For example, RI=0 represents that a current physical channel can carry data of one layer. The indication information is used to indicate that $W_2$ includes N $X_{i,l}^1$ whose values are 0. The PMI2 is used to indicate a parameter of $W_2$. The following separately describes the CSI generated by the terminal device in S202 when $Y_{i,l}$ meets the formula $Y_{i,l}=X_{i,l}^1 \times X_{i,l}^2 \times X_{i,l}^3$ and when $Y_{i,l}$ meets the formula $Y_{i,l}=X_{i,l}^1 \times X_{i,l}^3$.

Case 1: $Y_{i,l}$ meets the formula $Y_{i,l}=X_{i,l}^1 \times X_{i,l}^2 \times X_{i,l}^3$.

Based on Case 1, the indication information included in the CSI is used to indicate that $W_2$ includes N $X_{i,l}^1$ whose values are 0. This could be understood as follows: The indication information is used to indicate that N $X_{i,l}^1$ whose values are 0 are included in all elements of $W_2$, N represents a quantity of all $X_{i,l}^1$ whose values are 0 included in $W_2$. For example, when the quantity of all $X_{i,l}^1$ whose values are 0 included in $W_2$ is 5, N is 5, the indication information is used to indicate that $W_2$ includes five $X_{i,l}^1$ whose values are 0, and 3 bits are required to carry the indication information. The PMI2 reported by the network device is used to indicate all $X_{i,l}^1$ in the precoding matrix $W_2$ and those $X_{i,l}^2$ and $X_{i,l}^3$ other than $X_{i,l}^2$ and $X_{i,l}^3$ that correspond to the five $X_{i,l}^1$ whose values are 0. Since a wideband reporting manner or a long-period reporting manner is used for $X_{i,l}^1$, while a subband or short-period reporting manner is used for $X_{i,l}^2$ and $X_{i,l}^3$, the quantity of bits required by the PMI2 that indicates $W_2$ can be reduced when the UE does not report $X_{i,l}^2$ and $X_{i,l}^3$ that correspond to $X_{i,l}^1$ whose value is 0.

The indication information included in the CSI is used to indicate that $W_2$ includes N $X_{i,l}^1$ whose values are 0. This may be alternatively understood as follows: The indication information is used to indicate that N $X_{i,l}^1$ whose values are 0 are included in a part of elements of $W_2$. If only a part of all $X_{i,l}^1$ whose values are 0 in $W_2$ are included in the a part of elements of $W_2$, N represents a quantity of the a part of all $X_{i,l}^1$ whose values are 0 included in $W_2$. For example, when a quantity of all $X_{i,I}^1$ whose values are 0 included in $W_2$ is 5, N may be 0 to 4. Using N=4 as an example, the indication information is used to indicate that $W_2$ includes four $X_{i,I}^1$ whose values are 0, and 2 bits are required to carry the indication information. In an implementation, it may be determined, based on a preset order, that a quantity of which $X_{i,I}^1$ in all $X_{i,I}^1$ whose values are 0 in $W_2$ is the quantity of $X_{i,I}^1$, whose values are 0, indicated by the indication information. Both the terminal device and the network device know the preset order. Using that $W_2$ includes one column vector as example, assuming that the quantity of all $X_{i,I}^1$ whose values are 0 included in $W_2$ is 5, four $X_{i,I}^1$ whose values are 0 in $W_2$ may be successively determined from top to down starting from a first row vector in $W_2$ The four determined $X_{i,I}^1$ whose values are 0 then are the four $X_{i,I}^1$ whose values are 0 indicated by the indication information.

In conclusion, assuming that the quantity of all $X_{i,I}^1$ whose values are 0 included in $W_2$ is 5, compared with that the indication information is used to indicate that $W_2$ includes five $X_{i,I}^1$ whose values are 0, when the indication information is used to indicate that $W_2$ includes four $X_{i,I}^1$ whose values are 0, fewer bits are required to carry the indication information. Therefore, when N represents the quantity of a part of all $X_{i,I}^1$ whose values are 0 included in $W_2$, the quantity of bits required to carry the indication information may be reduced.

Based on Case 1, the PMI2 included in the CSI is used to indicate a parameter of $W_2$ in W, and the parameter of $W_2$ indicated by the PMI2 includes all $X_{i,I}^1$ in $W_2$ and $X_{i,I}^2$ and $X_{i,I}^3$, which are corresponding to $X_{i,I}^1$ other than the N $X_{i,I}^1$ whose values are 0, in $W_2$, and the parameter of $W_2$ does not include $X_{i,I}^2$ and $X_{i,I}^3$, which are corresponding to the N $X_{i,I}^1$ whose values are 0, in $W_2$. That $X_{i,I}^1$ corresponds to $X_{i,I}^2$ and $X_{i,I}^3$ means that, based on Case 1, $X_{i,I}^1$ in $Y_{i,I}$ at any location in $W_2$ corresponds to $X_{i,I}^2$ and $X_{i,I}^3$ in $Y_{i,I}$. For $X_{i,I}^1$, $X_{i,I}^2$, and $X_{i,I}^3$ that have a correspondence, a value of $X_{i,I}^1$ may determine a value of $X_{i,I}^2$ and a value of $X_{i,I}^3$. When the value of $X_{i,I}^1$ is 0, the value of $X_{i,I}^2$ corresponding to $X_{i,I}^1$ is 0, and the value of $X_{i,I}^3$ corresponding to $X_{i,I}^1$ is also 0. For example, in an element $Y_{2,1} = X_{2,1}^1 \times X_{2,1}^2 \times X_{2,1}^3$ at a location in a $2^{nd}$ row and a $1^{st}$ column in $W_2$, $X_{2,1}^1$ corresponds to $X_{2,1}^2$ and $X_{2,1}^3$. When a value of $X_{2,1}^1$ is 0, $Y_{2,1}=0$. A value of $X_{2,1}^2$ corresponding to $X_{2,1}^1$ does not affect a value of $Y_{2,1}$, and a value of $X_{2,1}^3$ corresponding to $X_{2,1}^1$ does not affect the value of $Y_{2,1}$, either. Therefore, when the parameter of $W_2$ indicated by the PMI2 that is sent by the terminal device to the network device includes all $X_{i,I}^1$ in $W_2$, the terminal device may not feedback, to the network device, $X_{i,I}^2$ and $X_{i,I}^3$ that correspond to $X_{i,I}^1$ whose value is 0. In this way, a quantity of bits required by the terminal device to feed back the PMI2 to the network device can be reduced.

The parameter of $W_2$ indicated by the PMI2 relates to the N $X_{i,I}^1$ whose values are 0, included in $W_2$ and indicated by the indication information. Assuming that the quantity of all $X_{i,I}^1$ whose values are 0 included in $W_2$ is 5, when the indication information indicates that $W_2$ includes five $X_{i,I}^1$ whose values are 0, the parameter of $W_2$ corresponding to the PMI2 includes all $X_{i,I}^1$ in $W_2$ and $X_{i,I}^2$ and $X_{i,I}^3$, which are corresponding to $X_{i,I}^1$ whose value is not 0, in $W_2$, and the parameter of $W_2$ corresponding to the PMI2 does not include $X_{i,I}^2$ and $X_{i,I}^3$, which are corresponding to $X_{i,I}^1$ whose values are 0, in $W_2$ Assuming that the quantity of all $X_{i,I}^1$ whose values are 0 included in $W_2$ is 5, when the indication information indicates that $W_2$ includes four $X_{i,I}^1$ whose values are 0, the indication information does not indicate one $X_{i,I}^1$ whose value is 0 in $W_2$, the parameter of $W_2$ corresponding to the PMI2 includes all $X_{i,I}^1$ in $W_2$, $X_{i,I}^2$ and $X_{i,I}^3$, which are corresponding to $X_{i,I}^1$ whose value is not 0, in $W_2$, and $X_{i,I}^2$ and $X_{i,I}^3$, which are corresponding to $X_{i,I}^1$ whose value is 0 and that is not indicated by the indication information, in $W_2$, and the parameter of $W_2$ corresponding to the PMI2 does not include $X_{i,I}^2$ and $X_{i,I}^3$, which are corresponding to the four $X_{i,I}^1$ whose value are 0 and that are indicated by the indication information, in $W_2$.

Case 2: $Y_{i,I}$ meets the formula $Y_{i,I} = X_{i,I}^1 \times X_{i,I}^3$.

Based on Case 2, the indication information included in the CSI is used to indicate that $W_2$ includes N $X_{i,I}^1$ whose values are 0. This may be understood as follows: The indication information is used to indicate that N $X_{i,I}^1$ (whose values are 0) are included in all elements of $W_2$. In this case, N represents the quantity of all $X_{i,I}^1$ whose values are 0 included in $W_2$. This may be alternatively understood as follows: The indication information is used to indicate that N $X_{i,I}^1$ whose values are 0 are included in a part of elements of $W_2$, and in this case, N represents a quantity of a part of all $X_{i,I}^1$ whose values are 0 included in $W_2$. For related descriptions about the indication information in Case 2, refer to the related descriptions about the indication information in Case 1. Details are not repeatedly described herein.

Based on Case 2, the PMI2 included in the CSI is used to indicate a parameter of $W_2$ in W, and the parameter of $W_2$ indicated by the PMI2 includes all $X_{i,I}^1$ in $W_2$ and $X_{i,I}^3$, corresponding to $X_{i,I}^1$ other than the N $X_{i,I}^1$ whose values are 0, in $W_2$, and the parameter of $W_2$ does not include $X_{i,I}^3$, corresponding to the N $X_{i,I}^1$ whose values are 0, in $W_2$. That $X_{i,I}^1$ corresponds to $X_{i,I}^3$ means that, based on Case 2, $X_{i,I}^1$ in $Y_{i,I}$ at any location in $W_2$ corresponds to $X_{i,I}^3$ in $Y_{i,I}$. For $X_{i,I}^1$ and $X_{i,I}^3$ that have a correspondence, a value of $X_{i,I}^1$ may determine a value of $X_{i,I}^3$. When the value of $X_{i,I}^1$ is 0, the value of $X_{i,I}^3$ corresponding to $X_{i,I}^1$ is 0. For example, in an element $Y_{2,1} = X_{2,1}^1 \times X_{2,1}^2 \times X_{2,1}^3$ at a location in a $2^{nd}$ row and a $1^{st}$ column in $W_2$, when a value of $X_{2,1}^1$ is 0, $Y_{2,1}=0$. A value of $X_{2,1}^3$ corresponding to $X_{2,1}^1$ does not affect a value of $Y_{2,1}$. The network device may determine, based on $X_{i,I}^1$ whose value is 0, that a value of $X_{i,I}^3$ corresponding to $X_{i,I}^1$ is 0. Therefore, when the parameter of $W_2$ indicated by the PMI2 that is sent by the terminal device to the network device includes all $X_{i,I}^1$ in $W_2$, the terminal device may not feedback, to the network device, $X_{i,I}^3$ that corresponds to $X_{i,I}^1$ whose value is 0. In this way, a quantity of bits required by the terminal device to feed back the PMI2 to the network device can be reduced.

The parameter of $W_2$ indicated by the PMI2 relates to the N $X_{i,I}^1$, whose values are 0, included in $W_2$ and indicated by the indication information. Assuming that the quantity of all $X_{i,I}^1$ whose values are 0 included in $W_2$ is 5, when the indication information indicates that $W_2$ includes five $X_{i,I}^1$ whose values are 0, the parameter of $W_2$ corresponding to the PMI2 includes all $X_{i,I}^1$ in $W_2$ and $X_{i,I}^3$, corresponding to $X_{i,I}^1$ whose value is not 0, in $W_2$, and the parameter of $W_2$ corresponding to the PMI2 does not include $X_{i,I}^3$, corresponding to $X_{i,I}^1$ whose values are 0, in $W_2$. Assuming that the quantity of all $X_{i,I}^1$ whose values are 0 included in $W_2$ is 5, when the indication information indicates that $W_2$ includes four $X_{i,I}^1$ whose values are 0, the indication information does not indicate one $X_{i,I}^1$ whose value is 0 in $W_2$, the parameter of $W_2$ corresponding to the PMI2 includes all $X_{i,I}^1$ in $W_2$, $X_{i,I}^3$, corresponding to $X_{i,I}^1$ whose value is not 0, in $W_2$, and $X_{i,I}^3$, corresponding to $X_{i,I}^1$ whose value is 0 and that is not indicated by the indication information, in $W_2$, and the parameter of $W_2$ corresponding to the PMI2 does not include $X_{i,I}^3$, corresponding to the four $X_{i,I}^1$ whose value are 0 and that are indicated by the indication information, in $W_2$.

Based on Case 1 or Case 2, a form of the indication information in this embodiment includes but is not limited to any one of the following forms.

When that the indication information is used to indicate that $W_2$ includes N $X_{i,l}^1$ whose values are 0 is understood as that the indication information is used to indicate that N $X_{i,l}^1$ whose values are 0 are included in all elements of $W_2$, and N represents the quantity of all $X_{i,l}^1$ whose values are 0 included in $W_2$, the indication information may be in the following three specific forms.

Form 1: The indication information includes a quantity N of $X_{i,l}^1$ whose values are 0 in all elements of $W_2$.

Form 2: The indication information includes a quantity $N_l$ of $X_{i,l}^1$ whose values are 0 in all elements of an $l^{th}$ column vector in $W_2$, where l is an integer greater than or equal to 0 and less than or equal to L−1, and $$\sum_{l=0}^{L-1} N_l = N \cdot \sum_{l=0}^{L-1} N_l = N$$

represents that a sum of quantities of $X_{i,l}^1$ whose values are 0 in all elements of all column vectors in $W_2$ is N. For example, when $W_2$ includes one column vector, the indication information includes a quantity $N_0$ of $X_{i,l}^1$ whose values are 0 in all elements of the column vector, and $N=N_0$. For another example, when $W_2$ includes two column vectors, i.e., a first column vector and a second column vector, the indication information includes a quantity $N_0$ of $X_{i,l}^1$ whose values are 0 in all elements of the first column vector and a quantity $N_1$ of $X_{i,l}^1$ whose values are 0 in all elements of the second column vector, and $N=N_0+N_1$.

Form 3: The indication information includes a quantity $N_l^0$ of $X_{i,l}^1$ whose values are 0 in first I elements of an $l^{th}$ column vector in $W_2$ and a quantity $N_l^1$ of $X_{i,l}^1$ whose values are 0 in last I elements of the column vector, where l is an integer greater than or equal to 0 and less than or equal to L−1, and $$\sum_{l=0}^{L-1} (N_l^0 + N_l^1) = N.$$

For example, when $W_2$ includes one column vector, the indication information includes a quantity $N_l^0$ of $X_{i,l}^1$ whose values are 0 in first I elements of the column vector and a quantity $N_l^1$ of $X_{i,l}^1$ whose values are 0 in last I elements of the column vector, and $N=N_0^0+N_0^1$. For another example, when $W_2$ includes two column vectors, i.e., a first column vector and a second column vector, the indication information includes $N_0^0$, $N_0^1$, $N_1^0$, and $N_1^1$, and $N=N_0^0+N_0^1+N_1^1$. $N_0^0$ represents a quantity of $X_{i,l}^1$ whose values are 0 in first I elements of the first column vector in $W_2$, $N_0^1$ represents a quantity of $X_{i,l}^1$ whose values are 0 in last I elements of the first column vector in $W_2$, $N_1^0$ represents a quantity of $X_{i,l}^1$ whose values are 0 in first I elements of the second column vector in $W_2$ and $N_1^1$ represents a quantity of $X_{i,l}^1$ whose values are 0 in last I elements of the second column vector in $W_2$.

When that the indication information is used to indicate that $W_2$ includes N $X_{i,l}^1$ whose values are 0 is understood as that the indication information is used to indicate that N $X_{i,l}^1$ whose values are 0 are included in a part of the elements of $W_2$, N represents a quantity of a part of all $X_{i,l}^1$ whose values are 0 included in $W_2$, the indication information may be in the following two specific forms.

Form 4: The indication information includes a quantity N of $X_{i,l}^1$ whose values are 0 in a part of the elements of $W_2$.

Form 5: The indication information includes a quantity $T_l$ of $X_{i,l}^1$ whose values are 0 in a part of the elements of an $l^{th}$ column vector in $W_2$, where l is an integer greater than or equal to 0 and less than or equal to L−1, and $$\sum_{l=0}^{L-1} T_l = N \cdot \sum_{l=0}^{L-1} T_l = N$$

represents that a sum of quantities $T_l$ of $X_{i,l}^1$ whose values are 0 in a part of elements of all column vectors in $W_2$ is N. For example, when $W_2$ includes one column vector, the indication information includes a quantity $T_0$ of $X_{i,l}^1$ whose values are 0 in a part of elements of the column vector, and $T_0=N$. For another example, when $W_2$ includes two column vectors, that is, a first column vector and a second column vector, the indication information includes a quantity $T_0$ of $X_{i,l}^1$ whose values are 0 in a part of elements of the first column vector and a quantity $T_l$ of $X_{i,l}^1$ whose values are 0 in a part of elements of the second column vector, and $N=T_0+T_1$.

It should be noted that the indication information included in the CSI in this embodiment may be used to indicate that $W_2$ includes N $X_{i,l}^1$ whose values are 0, or the indication information may be used to indicate that $W_2$ includes M $X_{i,l}^1$ whose values are not 0. Because the network device has known a total quantity of $X_{i,l}^1$ included in $W_2$ after receiving the indication information used to indicate that $W_2$ includes M $X_{i,l}^1$ whose values are not 0, the network device can obtain, through calculation based on the indication information and the total quantity of $X_{i,l}^1$ included in $W_2$, that $W_2$ includes N $X_{i,l}^1$ whose values are 0.

S203. The terminal device sends a signal including the CSI to the network device.

Before S203, the terminal device may encode the generated CSI, to obtain the signal including the CSI. Then, the terminal device sends the signal including the CSI to the network device in S203. To ensure that the network device can decode the PMI2 based on the RI and the indication information, when encoding the CSI, the terminal device separately encodes the indication information and the PMI2, and also separately encodes the RI and the PMI2. In other words, the indication information and the PMI2 cannot be encoded together in a joint encoding manner, and the RI and the PMI2 cannot be encoded together in the joint encoding manner, either. In this way, it can be ensured that the network device can determine the PMI2 based on the RI and the indication information. As long as the network device can determine the PMI2 based on the RI and the indication information, an encoding manner in which the terminal device encodes each piece of information included in the CSI is not limited in this embodiment. In a possible implementation, when encoding the RI and the indication information that are included in the CSI, the terminal device may encode the RI and the indication information in the joint encoding manner.

In this embodiment, a first method for jointly encoding the RI and the indication information includes:

combining, by the terminal device, Q1 bits that carry the RI and Q2 bits that carry the indication information into Q1+Q2 bits; and then encoding the Q1+Q2 bits, to obtain D bits after the RI and the indication information are jointly encoded. For example, encoding manners, such as repetition coding, Reed-Muller coding, convolutional coding, or polarization coding can be used to encode the Q1+Q2 bits, an RI coding manner defined in an LTE system also may be used to encode the Q1+Q2 bits.

In this embodiment, a second method for jointly encoding the RI and the indication information includes:

predefining a status value set, where the status value set includes at least one status value, each of the at least one status value is used to indicate one type of combination information of an RI and indication information, the quantity of bits required to carry the status value is less than a sum of a quantity of bits required to carry the RI and a quantity of bits required to carry the indication information, and both the terminal device and the network device have known the predefined status value set; and selecting, by the terminal device, a status value from the predefined status value set, where the selected status value is used to indicate the combination information, determined by the terminal device, of the RI and the indication information, and then encoding the selected status value, to obtain jointly-encoded information of the RI and the indication information.

The quantity of bits required to carry the status value is less than the sum of the quantity of bits required to carry the RI and the quantity of bits required to carry the indication information. Therefore, compared with the method for separately carrying the RI and the indication information by using bits, according to the method for jointly indicating the RI and the indication information by using the status value, a quantity of bits required to indicate the RI and the indication information can be reduced. In this way, resource overheads required by the terminal device to feed back the CSI to the network device are reduced.

The following describes the predefined status value set by using an example.

The predefined status value set includes status values 1 to 78, a correspondence between a status value and combination information indicated by the status value is as follows:

the status value 1 indicates: RI=1, and N=0;
the status value 2 indicates: RI=1, and N=1;
the status value 3 indicates: RI=1, and N=2;
. . .
the status value 8 indicates: RI=1, and N=7;
the status value 9 indicates: RI=2, $N_0$=0, and $N_1$=0;
the status value 10 indicates: RI=2, $N_0$=1, and $N_1$=0;
. . .
the status value 16 indicates: RI=2, $N_0$=7, and $N_1$=0;
the status value 17 indicates: RI=2, $N_0$=0, and $N_1$=1;
. . .
the status value 72 indicates: RI=2, $N_0$=7, and $N_1$=7;
the status value 73 indicates: RI=3;
the status value 74 indicates: RI=4;
the status value 75 indicates: RI=5;
the status value 76 indicates: RI=6;
the status value 77 indicates: RI=7; and
the status value 78 indicates: RI=8.

In the foregoing correspondence between a status value and combination information, indicated by the status value, of RI and indication information, N, $N_0$, or $N_1$ represents the indication information. For $N_0$ and $N_1$ that are indicated by the status values 9 to 72, refer to Form 2 in the foregoing related description about the indication information. A high precision codebook is usually applicable to a scenario in which a value of an RI is relatively small; therefore, in the foregoing correspondence, when the RI is 1 or 2, a high precision codebook is used to feed back a PMI2; when the RI is greater than 2, a low precision codebook is used to feedback a PMI2. The indication information relates only to the high precision codebook; therefore, in the foregoing correspondence, when the RI is greater than 2, there is no indication information corresponding to the status value.

Seven bits are required to carry one of the foregoing 76 status values. When the RI is any one of 1 to 8, 3 bits are required to carry the RI, and at least 6 bits are required to carry the indication information in the foregoing correspondence. Therefore, compared with the method for separately carrying the RI and the indication information by using bits, according to the method for jointly indicating the RI and the indication information by using a status value, at least 2 bits can be saved. Assuming that the terminal device determines that RI=1 and N=0 in the CSI, the terminal device selects the status value 1 in the foregoing status value set, encodes the status value 1, and sends the encoded status value 1 to the network device.

Figure 3:
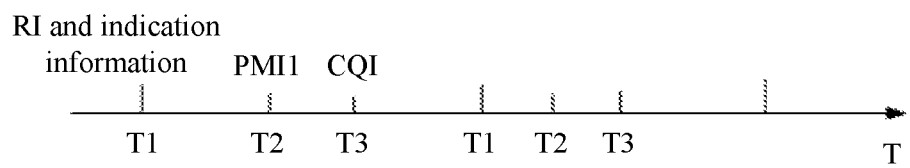
FIG. 3 is a schematic diagram of periodically reporting CSI according to an embodiment of this application.

It should be noted that on a premise that neither the RI and the PMI2 nor the indication information and the PMI2 are jointly encoded and further, the network device can determine the PMI2 based on the RI and the indication information, a manner in which the terminal device sends the CSI to the network device in S202 is not limited in this embodiment. The terminal device may send the CSI to the network device in a periodic reporting manner or in an aperiodic reporting manner. When the terminal device sends the CSI to the network device in the periodic reporting manner, using a schematic diagram of periodically reporting CSI shown in FIG. 3 as an example, the terminal device reports an RI and indication information to the network device at a time point T1, the terminal device reports a PMI1 to the network device at a time point T2, and the terminal device reports a PMI2 and a CQI to the network device at a time point T3. In this way, the network device can decode the PMI2 based on the RI and the indication information that are obtained at the time point T1 through decoding. When the terminal device sends the CSI to the network device in the aperiodic reporting manner, the terminal device needs to send all information included in the CSI to the network device at a same time point.

S204. The network device receives the signal that includes the CSI and that is sent by the terminal device, and then obtains the RI and the indication information based on the signal including the CSI.

After receiving the signal that includes the CSI and that is sent by the terminal device, the network device decodes bits that are in the signal including the CSI and that are used to carry the RI and the indication information, to obtain the RI and the indication information. In a possible implementation, when the signal including the CSI is obtained by jointly encoding the RI and the indication information by the terminal device, the network device may decode jointly-encoded information, to obtain the RI and the indication information.

For the foregoing first method used by the terminal device for jointly encoding the RI and the indication information, the signal that includes the CSI and that is received by the network device includes the D encoded bits. The network device first decodes the D encoded bits, to obtain the Q1+Q2 bits, and then decodes, based on a quantity of the Q1+Q2 bits, a signal that includes the RI and the indication information and that is in a CSI signal to obtain the RI and the indication information. The RI is represented by using Q1 bits, and the indication information is represented by using Q2 bits, and D=Q1+Q2.

For the foregoing second method used by the terminal device for jointly encoding the RI and the indication information, the signal that includes the CSI and that is received by the network device includes an encoded status value. The network device first decodes the encoded status value, to obtain a status value, and then determines, based on the status value and the predefined status value set, the RI and the indication information that are indicated by the status value.

That the network device decodes bits that are in the signal including the CSI and that are used to carry the RI and the indication information, to obtain the RI and the indication information includes:

selecting, by the terminal device, a status value that is used to indicate combination information of the RI and the indication information; and encoding, by the terminal device, the selected status value, to obtain the signal including the CSI.

S205. The network device obtains, based on the RI and the indication information, the PMI2 included in the CSI.

After obtaining the RI and the indication information, the network device decodes, based on the RI and the indication information, the PMI2 included in the encoded CSI, to obtain the PMI2. In this embodiment, the PMI2 may be obtained based on the RI and the indication information in a plurality of manners. In a possible implementation, the network device first determines, based on the RI and the indication information, a quantity of bits required by the PMI2, and then decodes, based on the RI and the quantity of bits required by the PMI2, the PMI2 included in the encoded CSI.

A method for determining, by the network device based on the RI and the indication information, the quantity of bits required by the PMI2 includes: determining, based on the RI, a quantity of columns of the precoding matrix $W_2$ indicated by the PMI2, and determining, based on the indication information, a quantity of elements that are indicated by the PMI2 and that are in the precoding matrix $W_2$, to determine the quantity of bits required to carry the PMI2; and determining, by the network device based on the RI and the quantity of bits required by the PMI2, a quantity of bits for decoding the CSI including the PMI2, and decoding the PMI2 included in the encoded CSI. Alternatively, the network device determines, based on the RI and the indication information, a quantity of bits of the CSI including the PMI2, to decode the CSI including the PMI2.

In this embodiment, the CSI that is sent by the terminal device to the network device may further include a first precoding matrix indicator PMI1 and/or a channel quality indicator CQI. The PMI1 is used to indicate elements in $W_1$, $W_1$ meets $$W_1 = \begin{bmatrix} X_1 & 0 \\ 0 & X_1 \end{bmatrix},$$

$X_1$ is a matrix with $N_t/2$ rows and I columns, $X_1=[v_0 \ldots v_{M-1}]$, $v_m$ is a column vector including $N_t/2$ elements, m is an integer greater than or equal to 0 and less than or equal to I−1, and I is an integer greater than or equal to 1. $W_1$ is described in detail above, and details are not repeatedly described herein. In this embodiment, a parameter included in the PMI1, a parameter included in the CQI, a process of sending the PMI1 and the CQI by the terminal device to the network device, and a process of decoding the PMI1 and the CQI by the network device are all similar to those in the prior art, and details are not described herein.

S206. The network device determines W based on the RI and the PMI2.

When the CSI that is sent by the terminal device to the network device includes the PMI1, the network device may determine W based on the RI, the PMI1, and the PMI2 in S206. A method includes: determining, by the network device based on the RI, the PMI1, and the PMI2, the precoding matrix from a predefined precoding matrix group. A specific implementation method thereof includes: storing, by the network device, all precoding matrices, and determining, based on the RI, the PMI1, and the PMI2, the precoding matrix from the stored precoding matrices; or generating, by the network device, the precoding matrix based on the RI, the PMI1, the PMI2, and a predefined rule.

In the channel state information sending and receiving method provided in this embodiment of this application, the CSI that is sent by the terminal device to the network device includes the RI, the indication information, and the PMI2. The PMI2 is used to indicate the parameter of $W_2$, $W_2$ is a matrix with 2I rows and L columns, L is the rank indicated by the RI, l is an integer greater than or equal to 1, $Y_{i,l}$ represents the element at the location in the $i^{th}$ row and the $l^{th}$ column in $W_2$, i is an integer greater than or equal to 0 and less than and equal to 2I−1, and l is an integer greater than or equal to 0 and less than or equal to L−1. $Y_{i,l}$ meets the formula $Y_{i,l}=X_{i,l}^1 \times X_{i,l}^2 \times X_{i,l}^3$, $X_{i,l}^3$ is a complex number with modulus 1, the indication information is used to indicate that $W_2$ includes N $X_{i,l}^1$ whose values are 0, the parameter of $W_2$ indicated by the PMI2 includes all $X_{i,l}^1$ in $W_2$ and $X_{i,l}^2$ and $X_{i,l}^3$, which are corresponding to $X_{i,l}^1$ other than the N $X_{i,l}^1$, whose values are 0, in $W_2$, and the parameter of $W_2$ does not include $X_{i,l}^2$ and $X_{i,l}^3$, which are corresponding to the N $X_{i,l}^1$ whose values are 0, in $W_2$. Alternatively, $Y_{i,l}$ meets the formula $Y_{i,l}=X_{i,l}^1 \times X_{i,l}^2$, $X_{i,l}^3$ is a complex number with modulus 1, the indication information is used to indicate that $W_2$ includes N $X_{i,l}^1$ whose values are 0, the parameter of $W_2$ includes all $X_{i,l}^1$, in $W_2$ and $X_{i,l}^3$, corresponding to $X_{i,l}^1$ other than the N $X_{i,l}^1$ whose values are 0, in $W_2$, and the parameter of $W_2$ does not include $X_{i,l}^3$, corresponding to the N $X_{i,l}^1$ whose values are 0, in $W_2$. The network device may obtain the PMI2 by using the RI and the indication information. In the scenario of a high precision codebook-based precoding matrix, in the prior art, a PMI2 that is sent by a terminal device to a network device needs to indicate a parameter of all elements of $W_2$. However, in the technical solutions provided in this embodiment of this application, the parameter of $W_2$ indicated by the PMI2 that is sent by the terminal device to the network device is a part of parameters of elements of $W_2$. Therefore, the quantity of bits required by the terminal device to send the PMI2 to the network device is reduced. The indication information is added to the CSI that is sent by the terminal device to the network device, so that the network device can obtain the PMI2 by using the RI and the indication information. In conclusion, according to the technical solutions provided in this embodiment of this application, resource overheads required by the terminal device to feed back the CSI to the network device can be reduced in the scenario of a high precision codebook-based precoding matrix.

Figure 4:
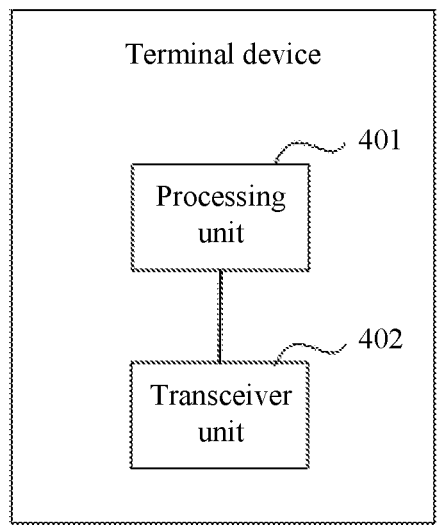
FIG. 4 is a schematic structural diagram of a terminal device according to an embodiment of this application.

Based on the same application concept, an embodiment of this application further provides a terminal device. The terminal device may implement the method performed by the terminal device in the method provided in the embodiment corresponding to FIG. 2. Referring to FIG. 4, the terminal device includes a processing unit 401 and a transceiver unit 402.

The processing unit 401 is configured to determine a precoding matrix W; and generate CSI that includes an RI, indication information, and a second precoding matrix indicator PMI2.

W meets a formula $W=W_1 \times W_2$, W is a matrix with $N_t$ rows and L columns, $w_1$ is a matrix with $N_t$ rows and 2I columns, $W_2$ is a matrix with 2I rows and L columns. $N_t$ is a quantity of antenna ports, L is a rank indicated by the rank indicator RI, $N_t$ is greater than or equal to L, and I is an integer greater than or equal to 1; an element at a location in an $i^{th}$ row and an $l^{th}$ column in $W_2$ is $Y_{i,l}$, i is an integer greater than or equal to 0 and less than or equal to 2I−1, l is an integer greater than or equal to 0 and less than or equal to L−1, and $Y_{i,l}$, meets a formula $Y_{i,l}=X_{i,l}^1 \times X_{i,l}^2 \times X_{i,l}^3$, $X_{i,l}^3$ is a complex number with modulus 1; and the indication information is used to indicate that $W_2$ includes N $X_{i,l}^1$ whose values are 0. The PMI2 is used to indicate a parameter of $W_2$, and the parameter of $W_2$ indicated by the PMI2 includes all $X_{i,l}^1$ in $W_2$ and $X_{i,l}^2$ and $X_{i,l}^3$, which are corresponding to $X_{i,l}^1$ other than the N $X_{i,l}^1$ whose values are 0, in $W_2$, and does not include $X_{i,l}^2$ and $X_{i,l}^3$, which are corresponding to the N $X_{i,l}^1$ whose values are 0, in $W_2$.

Alternatively, W meets a formula $W=W_1 \times W_2$, W is a matrix with $N_t$ rows and L columns, $W_1$ is a matrix with $N_t$ rows and 2I columns, $W_2$ is a matrix with 2I rows and L columns. $N_t$ is a quantity of antenna ports, L is a rank indicated by the rank indicator RI, $N_t$ is greater than or equal to L, and I is an integer greater than or equal to 1; an element at a location in an $i^{th}$ row and an $l^{th}$ column in $W_2$ is $Y_{i,l}$, i is an integer greater than or equal to 0 and less than or equal to 2I−1, l is an integer greater than or equal to 0 and less than or equal to L−1, and $Y_{i,l}$, meets a formula $Y_{i,l}=X_{i,l}^1 \times X_{i,l}^2$, $X_{i,l}^3$ is a complex number with modulus 1; and the indication information is used to indicate that $W_2$ includes N $X_{i,l}^1$ whose values are 0. The PMI2 is used to indicate a parameter of $W_2$, and the parameter of $W_2$ indicated by the PMI2 includes all $X_{i,l}^1$ in $W_2$ and $X_{i,l}^3$ corresponding to $X_{i,l}^1$ other than the N $X_{i,l}^1$, whose values are 0, in $W_2$, and does not include $X_{i,l}^3$, corresponding to the N $X_{i,l}^1$ whose values are 0, in $W_2$.

The transceiver unit 402 is configured to send a signal including the CSI to a network device.

In a possible implementation, $X_{i,l}^1$ represents a wideband amplitude, $X_{i,l}^2$ represents a subband amplitude, and $X_{i,l}^3$ represents a phase.

In a possible implementation, that the indication information is used to indicate that $W_2$ includes N $X_{i,l}^1$ whose values are 0 is specifically:
  the indication information includes a quantity N of $X_{i,l}^1$ whose values are 0 in all elements of $W_2$; or
  the indication information includes a quantity $N_l$ of $X_{i,l}^1$ whose values are 0 in all elements of an $l^{th}$ column vector in $W_2$, where l is an integer greater than or equal to 0 and less than or equal to L−1, and $$\sum_{l=0}^{L-1} N_l = N;$$

or
  the indication information includes a quantity $N_l^0$ of $X_{i,l}^1$ whose values are 0 in first I elements of an $l^{th}$ column vector in $W_2$ and a quantity $N_l^1$ of $X_{i,l}^1$ whose values are 0 in last I elements of the column vector, where l is an integer greater than or equal to 0 and less than or equal to L−1, and $$\sum_{l=0}^{L-1} (N_l^0 + N_l^1) = N;$$

or
  the indication information includes a quantity N of $X_{i,l}^1$ whose values are 0 in a part of elements of $W_2$; or
  the indication information includes a quantity $T_l$ of $X_{i,l}^1$ whose values are 0 in a part of elements of an $l^{th}$ column vector in $W_2$, where l is an integer greater than or equal to 0 and less than or equal to L−1, and $$\sum_{l=0}^{L-1} T_l = N.$$

In a possible implementation, the processing unit 401 is further configured to:
  before the transceiver unit 402 sends the signal including the CSI to the network device, separately encode the indication information and the PMI2, to obtain the signal including the CSI.

In a possible implementation, the processing unit 401 is further configured to:
  before the transceiver unit 402 sends the signal including the CSI to the network device, encode the RI and the indication information in a joint encoding manner, to obtain the signal including the CSI.

In a possible implementation, when encoding the RI and the indication information in the joint encoding manner, to obtain the signal including the CSI, the processing unit 401 is specifically configured to:
  represent the RI by using Q1 bits, and represent the indication information by using Q2 bits;
  combine the Q1 bits and the Q2 bits into Q1+Q2 bits; and
  encode the Q1+Q2 bits, to obtain the signal including the CSI.

In a possible implementation, when encoding the RI and the indication information in the joint encoding manner, to obtain the signal including the CSI, the processing unit 401 is specifically configured to:
  select a status value that is used to indicate combination information of the RI and the indication information; and
  encode the selected status value, to obtain the signal including the CSI.

In a possible implementation, the CSI further includes:
  a first precoding matrix indicator PMI1, where the PMI is used to indicate $W_1$, $W_1$ meets $$W_1 = \begin{bmatrix} X_1 & 0 \\ 0 & X_1 \end{bmatrix},$$

$X_1$ is a matrix with $N_t/2$ rows and I columns, $X_1=[v_0 \ldots v_{M-1}]$, $v_m$ is a column vector including $N_t/2$ elements, m is an integer greater than or equal to 0 and less than or equal to I−1, and I is an integer greater than or equal to 1.

It should be noted that unit division in this embodiment of this application is an example, is merely logical function division, and may be other division in an actual implementation. Functional units in this embodiment of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) or a processor (processor) to perform all or some of the steps of the method described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Figure 5:
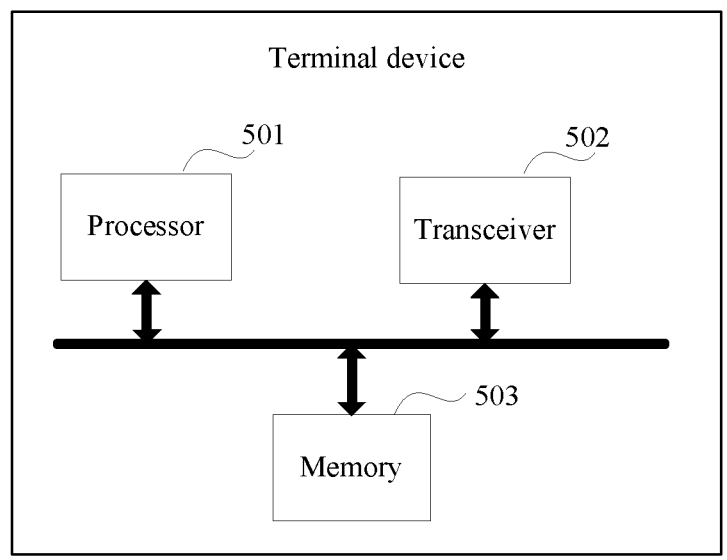
FIG. 5 is a schematic structural diagram of another terminal device according to an embodiment of this application.

Based on the same application concept, an embodiment of this application further provides a terminal device. The terminal device uses the method performed by the terminal device in the method provided in the embodiment corresponding to FIG. 2, and may be a device that is the same as the terminal device shown in FIG. 4. Referring to FIG. 5, the terminal device includes a processor 501, a transceiver 502, and a memory 503.

The processor 501 is configured to read a program in the memory 503, to execute the following process:
  determining a precoding matrix W; and generating CSI that includes an RI, indication information, and a second precoding matrix indicator PMI2.

W meets a formula $W=W_1 \times W_2$, W is a matrix with $N_t$ rows and L columns, $W_1$ is a matrix with $N_t$ rows and 2I columns, $W_2$ is a matrix with 2I rows and L columns. $N_t$ is a quantity of antenna ports, L is a rank indicated by the rank indicator RI, $N_t$ is greater than or equal to L, and I is an integer greater than or equal to 1; an element at a location in an $i^{th}$ row and an $l^{th}$ column in $W_2$ is $Y_{i,l}$, i is an integer greater than or equal to 0 and less than or equal to 2I−1, l is an integer greater than or equal to 0 and less than or equal to L−1, and $Y_{i,l}$, meets a formula $Y_{i,l}=X_{i,l}^1 \times X_{i,l}^2 \times X_{i,l}^3$, $X_{i,l}^3$ is a complex number with modulus 1; and the indication information is used to indicate that $W_2$ includes N $X_{i,l}^1$ whose values are 0. The PMI2 is used to indicate a parameter of $W_2$, and the parameter of $W_2$ indicated by the PMI2 includes all $X_{i,l}^1$ in $W_2$ and $X_{i,l}^2$ and $X_{i,l}^3$, which are corresponding to $X_{i,l}^1$ other than the N $X_{i,l}^1$ whose values are 0, in $W_2$, and does not include $X_{i,l}^2$ and $X_{i,l}^3$, which are corresponding to the N $X_{i,l}^1$ whose values are 0, in $W_2$.

Alternatively, W meets a formula $W=W_1 \times W_2$, W is a matrix with $N_t$ rows and L columns, $W_1$ is a matrix with $N_t$ rows and 2I columns, $W_2$ is a matrix with 2I rows and L columns, $N_t$ is a quantity of antenna ports, L is a rank indicated by the rank indicator RI, $N_t$ is greater than or equal to L, and I is an integer greater than or equal to 1; an element at a location in an $i^{th}$ row and an $l^{th}$ column in $W_2$ is $Y_{i,l}$, i is an integer greater than or equal to 0 and less than or equal to 2I−1, l is an integer greater than or equal to 0 and less than or equal to L−1, and $Y_{i,l}$ meets a formula $Y_{i,l}=X_{i,l}^1 \times X_{i,l}^3$, $X_{i,l}^3$ is a complex number with modulus 1; and the indication information is used to indicate that $W_2$ includes N $X_{i,l}^1$ whose values are 0. The PMI2 is used to indicate a parameter of $W_2$, and the parameter of $W_2$ indicated by the PMI2 includes all $X_{i,l}^1$ in $W_2$ and $X_{i,l}^3$, corresponding to $X_{i,l}^1$ other than the N $X_{i,l}^1$ whose values are 0, in $W_2$ and does not include $X_{i,l}^3$, corresponding to the N $X_{i,l}^1$ whose values are 0, in $W_2$.

The processor 501 is further configured to send, by using the transceiver 502, the CSI to a network device.

The transceiver 502 is configured to receive and send data under control of the processor 501.

In a possible implementation, $X_{i,l}^1$ represents a wideband amplitude, $X_{i,l}^2$ represents a subband amplitude, and $X_{i,l}^3$ represents a phase.

In a possible implementation, that the indication information is used to indicate that $W_2$ includes N $X_{i,l}^1$ whose values are 0 is specifically:
  the indication information includes a quantity N of $X_{i,l}^1$ whose values are 0 in all elements of $W_2$; or
  the indication information includes a quantity $N_l$ of $X_{i,l}^1$ whose values are 0 in all elements of an $l^{th}$ column vector in $W_2$, where l is an integer greater than or equal to 0 and less than or equal to L−1, and $$\sum_{l=0}^{L-1} N_l = N;$$

or
  the indication information includes a quantity $N_l^0$ of $X_{i,l}^1$ whose values are 0 in first I elements of an $l^{th}$ column vector in $W_2$ and a quantity $N_l^1$ of $X_{i,l}^1$ whose values are 0 in last I elements of the column vector, where l is an integer greater than or equal to 0 and less than or equal to L−1, and $$\sum_{l=0}^{L-1} (N_l^0 + N_l^1) = N;$$

or
  the indication information includes a quantity N of $X_{i,l}^1$ whose values are 0 in a part of elements of $W_2$; or
  the indication information includes a quantity $T_l$ of $X_{i,l}^1$ whose values are 0 in a part of elements of an $l^{th}$ column vector in $W_2$, where l is an integer greater than or equal to 0 and less than or equal to L−1, and $$\sum_{l=0}^{L-1} T_l = N.$$

In a possible implementation, the processor 501 is further configured to:
  before the transceiver 502 sends a signal including the CSI to the network device, separately encode the indication information and the PMI2, to obtain the signal including the CSI.

In a possible implementation, the processor 501 is further configured to:

before the transceiver 502 sends the signal including the CSI to the network device, encode the RI and the indication information in a joint encoding manner, to obtain the signal including the CSI.

In a possible implementation, when encoding the RI and the indication information in the joint encoding manner, to obtain the signal including the CSI, the processor 501 is specifically configured to:

represent the RI by using Q1 bits, and represent the indication information by using Q2 bits;

combine the Q1 bits and the Q2 bits into Q1+Q2 bits; and encode the Q1+Q2 bits, to obtain the signal including the CSI.

In a possible implementation, when encoding the RI and the indication information in the joint encoding manner, to obtain the signal including the CSI, the processor 501 is specifically configured to:

select a status value that is used to indicate combination information of the RI and the indication information; and encode the selected status value, to obtain the signal including the CSI.

In a possible implementation, the CSI further includes: a first precoding matrix indicator PMI1, where the PMI is used to indicate $W_1$, $W_1$ meets $$W_1 = \begin{bmatrix} X_1 & 0 \\ 0 & X_1 \end{bmatrix},$$

$X_1$ is a matrix with $N_t/2$ rows and I columns, $X_1=[v_0 \ldots v_{M-1}]$, $v_m$ is a column vector including $N_t/2$ elements, m is an integer greater than or equal to 0 and less than or equal to I−1, and I is an integer greater than or equal to 1.

The processor 501, the transceiver 502, and the memory 503 are connected to each other by using a bus. The bus may be a peripheral component interconnect (peripheral component interconnect, PCI) bus, an extended industry standard architecture (extended industry standard architecture, EISA) bus, or the like. The bus may be classified into an address bus, a data bus, a control bus, and the like.

In FIG. 5, a bus architecture may include any quantity of interconnected buses and bridges, and specifically connects together a circuit of one or more processors represented by the processor 501 and a circuit of a memory represented by the memory 503. The bus architecture may further connect together various other circuits such as a peripheral device, a voltage stabilizer, and a power management circuit. These are well known in the art, and therefore are not further described in this specification. A bus interface provides an interface. The transceiver 502 may be a plurality of components. To be specific, the transceiver 502 includes a transmitter and a receiver and provides units configured to communicate with various other apparatuses on a transmission medium. The processor 501 is responsible for management of the bus architecture and general processing, and the memory 503 may store data that is used when the processor 501 performs an operation.

Optionally, the processor 501 may be a central processing unit, an application-specific integrated circuit (Application Specific Integrated Circuit, ASIC), a field programmable gate array (Field-Programmable Gate Array, FPGA), or a complex programmable logic device (Complex Programmable Logic Device, CPLD).

An embodiment of this application further provides a computer storage medium. The storage medium stores a software program. When being read and executed by one or more processors, the software program is capable of implementing the CSI sending method performed by the terminal device in the foregoing embodiment.

An embodiment of this application further provides a terminal device, including at least one chip configured to perform the CSI sending method performed by the terminal device in the foregoing embodiment.

An embodiment of this application provides a computer program product including an instruction. When running on a computer, the computer program product enables the computer to perform the CSI sending method performed by the terminal device in the foregoing embodiment.

Figure 6:
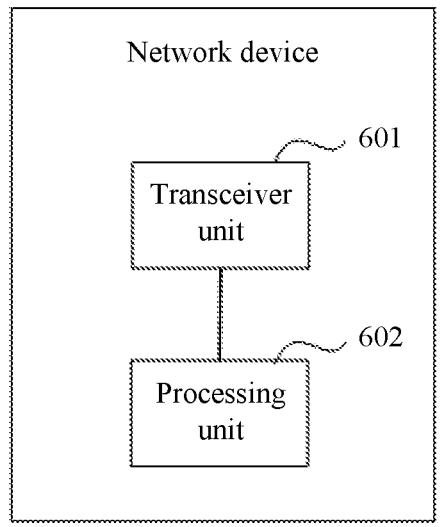
FIG. 6 is a schematic structural diagram of a network device according to an embodiment of this application.

Based on the same application concept, an embodiment of this application further provides a network device. The network device may implement the method performed by the network device in the method provided in the embodiment corresponding to FIG. 2. Referring to FIG. 6, the network device includes a transceiver unit 601 and a processing unit 602.

The transceiver unit 601 is configured to receive CSI that is sent by a terminal device, where the CSI includes a rank indicator RI, indication information, and a second precoding matrix indicator PMI2.

The processing unit 602 is configured to: obtain the RI and the indication information that are included in the CSI; obtain, based on the RI and the indication information, the PMI2 included in the CSI; and determine a precoding matrix W based on the rank indicator RI and the second precoding matrix indicator PMI2.

W meets a formula $W=W_1 \times W_2$, W is a matrix with $N_t$ rows and L columns, $W_1$ is a matrix with $N_t$ rows and 2I columns, $W_2$ is a matrix with 2I rows and L columns. $N_t$ is a quantity of antenna ports, L is a rank indicated by the RI, $N_t$ is greater than or equal to L, and I is an integer greater than or equal to 1; an element at a location in an $i^{th}$ row and an $l^{th}$ column in $W_2$ is $Y_{i,l}$, i is an integer greater than or equal to 0 and less than or equal to 2I−1, l is an integer greater than or equal to 0 and less than or equal to L−1, and $Y_{i,l}$ meets a formula $Y_{i,l}=X_{i,l}^1 \times X_{i,l}^2 \times X_{i,l}^3$, $X_{i,l}^3$ is a complex number with modulus 1; and the indication information is used to indicate that $W_2$ includes N $X_{i,l}^1$ whose values are 0, the PMI2 is used to indicate a parameter of $W_2$, and the parameter of $W_2$ indicated by the PMI2 includes all $X_{i,l}^1$ in $W_2$ and $X_{i,l}^2$ and $X_{i,l}^3$, which are corresponding to $X_{i,l}^1$ other than the N $X_{i,l}^1$ whose values are 0, in $W_2$, and does not include $X_{i,l}^2$ and $X_{i,l}^3$, which are corresponding to the N $X_{i,l}^1$ whose values are 0, in $W_2$.

Alternatively, W meets a formula $W=W_1 \times W_2$, W is a matrix with $N_t$ rows and L columns, $W_1$ is a matrix with $N_t$ rows and 2I columns, $W_2$ is a matrix with 2I rows and L columns, $N_t$ is a quantity of antenna ports, L is a rank indicated by the RI, $N_t$ is greater than or equal to L, and I is an integer greater than or equal to 1; an element at a location in an $i^{th}$ row and an $l^{th}$ column in $W_2$ is $Y_{i,l}$, i is an integer greater than or equal to 0 and less than or equal to 2I−1, l is an integer greater than or equal to 0 and less than or equal to L−1, and $Y_{i,l}$ meets a formula $Y_{i,l}=X_{i,l}^1 \times X_{i,l}^3$, $X_{i,l}^3$ is a complex number with modulus 1; and the indication information is used to indicate that $W_2$ includes N $X_{i,l}^1$ whose values are 0. The PMI2 is used to indicate a parameter of $W_2$, and the parameter of $W_2$ indicated by the PMI2 includes all $X_{i,l}^1$ in $W_2$ and $X_{i,l}^3$, corresponding to $X_{i,l}^1$ other than the N $X_{i,l}^1$ whose values are 0, in $W_2$, and does not include $X_{i,l}^3$, corresponding to the N $X_{i,l}^1$ whose values are 0, in $W_2$.

In a possible implementation, $X_{i,l}^1$ represents a wideband amplitude, $X_{i,l}^2$ represents a subband amplitude, and $X_{i,l}^3$ represents a phase.

In a possible implementation, that the indication information is used to indicate that $W_2$ includes N $X_{i,l}^1$ whose values are 0 is specifically:

the indication information includes a quantity N of $X_{i,l}^1$ whose values are 0 in all elements of $W_2$; or the indication information includes a quantity N of $X_{i,l}^1$ whose values are 0 in all elements of an $l^{th}$ column vector in $W_2$, where l is an integer greater than or equal to 0 and less than or equal to L−1, and $$\sum_{l=0}^{L-1} N_l = N;$$

or the indication information includes a quantity $N_l^0$ of $X_{i,l}^1$ whose values are 0 in first I elements of an $l^{th}$ column vector in $W_2$ and a quantity $N_l^1$ of $X_{i,l}^1$ whose values are 0 in last I elements of the column vector, where l is an integer greater than or equal to 0 and less than or equal to L−1, and $$\sum_{l=0}^{L-1} (N_l^0 + N_l^1) = N;$$

or the indication information includes a quantity N of $X_{i,l}^1$ whose values are 0 in a part of elements of $W_2$; or the indication information includes a quantity $T_l$ of $X_{i,l}^1$ whose values are 0 in a part of elements of an $l^{th}$ column vector in $W_2$, where l is an integer greater than or equal to 0 and less than or equal to L−1, and $$\sum_{l=0}^{L-1} T_l = N.$$

In a possible implementation, when obtaining the RI and the indication information based on a signal including the CSI, the processing unit 602 is specifically configured to:

decode bits that are in the signal including the CSI and that are used to carry the RI and the indication information, to obtain the RI and the indication information.

When obtaining the PMI2 based on the RI and the indication information, the processing unit 602 is specifically configured to:

decode, based on the RI and the indication information, a bit that is in the signal including the CSI and that is used to carry the PMI2, to obtain the PMI2.

In a possible implementation, when decoding, based on the RI and the indication information, the bit that is in the signal including the CSI and that is used to carry the PMI2, to obtain the PMI2, the processing unit 602 is specifically configured to:

determine, based on the RI and the indication information, a quantity of bits required to decode the PMI2; and decode, based on the RI and the quantity of bits, the bit that is used to carry the PMI2, to obtain the PMI2.

In a possible implementation, when decoding the bits that include the RI and the indication information and that are in the CSI signal, to obtain the RI and the indication information, the processing unit 602 is specifically configured to:

decode, based on a quantity Q1+Q2 of bits, a signal that includes the RI and the indication information and that is in the CSI signal, to obtain the RI and the indication information.

The RI is represented by using Q1 bits, and the indication information is represented by using Q2 bits.

When decoding the bits that are in the signal including the CSI and that are used to carry the RI and the indication information, to obtain the RI and the indication information, the processing unit 602 is specifically configured to:

obtain a status value based on the bits that are used to carry the RI and the indication information, where the status value is used to indicate combination information of the RI and the indication information; and obtain the RI and the indication information based on the status value.

In a possible implementation, the CSI further includes:

a first precoding matrix indicator PMI1, where the PMI is used to indicate $W_1$, $W_1$ meets $$W_1 = \begin{bmatrix} X_1 & 0 \\ 0 & X_1 \end{bmatrix},$$

$X_1$ is a matrix with $N_t/2$ rows and I columns, $X_1=[v_0 \ldots v_{M-1}]$, $v_m$ is a column vector including $N_t/2$ elements, m is an integer greater than or equal to 0 and less than or equal to I−1, and I is an integer greater than or equal to 1.

When determining W based on the RI and the PMI2, the processing unit 602 is specifically configured to:

determine W based on the RI, the PMI1, and the PMI2.

Figure 7:
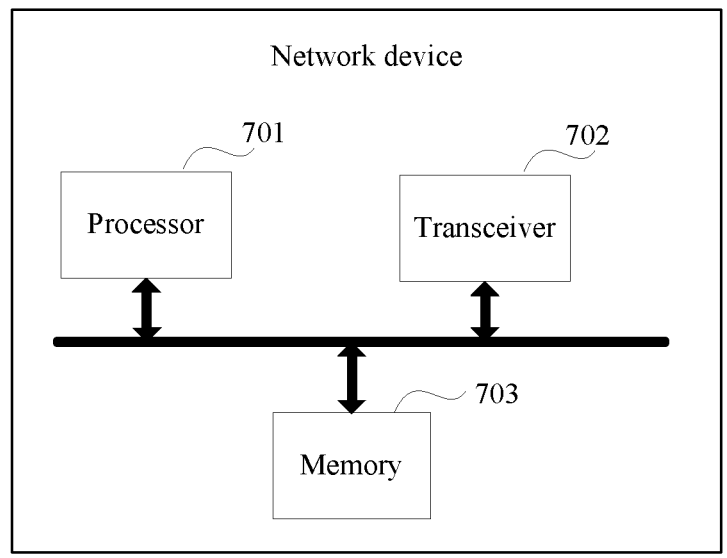
FIG. 7 is a schematic structural diagram of another network device according to an embodiment of this application.

Based on the same application concept, an embodiment of this application further provides a network device. The network device uses the method performed by the network device in the method provided in the embodiment corresponding to FIG. 2, and may be a device that is the same as the network device shown in FIG. 6. Referring to FIG. 7, the network device includes a processor 701, a transceiver 702, and a memory 703.

The processor 701 is configured to read a program in the memory 703, to execute the following process:

receiving, by using the transceiver 702, CSI that is sent by a terminal device, where the CSI includes a rank indicator RI, indication information, and a second precoding matrix indicator PMI2.

The processor 701 is further configured to: obtain the RI and the indication information that are included in the CSI; obtain, based on the RI and the indication information, the PMI2 included in the CSI; and determine a precoding matrix W based on the rank indicator RI and the second precoding matrix indicator PMI2.

W meets a formula $W=W_1 \times W_2$, W is a matrix with $N_t$ rows and L columns, $W_1$ is a matrix with $N_t$ rows and 2I columns, $W_2$ is a matrix with 2I rows and L columns. $N_t$ is a quantity of antenna ports, L is a rank indicated by the RI, $N_t$ is greater than or equal to L, and I is an integer greater than or equal to 1; an element at a location in an $i^{th}$ row and an $l^{th}$ column in $W_2$ is $Y_{i,l}$, i is an integer greater than or equal to 0 and less than or equal to 2I−1, l is an integer greater than or equal to 0 and less than or equal to L−1, and $Y_{i,l}$ meets a formula $Y_{i,l}=X_{i,l}^1 \times X_{i,l}^2 \times X_{i,l}^3$, $X_{i,l}^3$, is a complex number with modulus 1; and the indication information is used to indicate that $W_2$ includes N $X_{i,l}^1$ whose values are 0. The PMI2 is used to indicate a parameter of $W_2$, and the parameter of $W_2$ indicated by the PMI2 includes all $X_{i,l}^1$ in $W_2$ and $X_{i,l}^2$ and $X_{i,l}^3$, which are corresponding to $X_{i,l}^1$ other than the N $X_{i,l}^1$ whose values are 0, in $W_2$, and does not include $X_{i,l}^2$ and $X_{i,l}^3$, which are corresponding to the N $X_{i,l}^1$ whose values are 0, in $W_2$.

Alternatively, W meets a formula $W=W_1 \times W_2$, W is a matrix with $N_t$ rows and L columns, $W_1$ is a matrix with $N_t$ rows and 2I columns, $W_2$ is a matrix with 2I rows and L columns. $N_t$ is a quantity of antenna ports, L is a rank indicated by the RI, $N_t$ is greater than or equal to L, and I is an integer greater than or equal to 1; an element at a location in an $i^{th}$ row and an $l^{th}$ column in $W_2$ is $Y_{i,l}$, i is an integer greater than or equal to 0 and less than or equal to 2I-1, l is an integer greater than or equal to 0 and less than or equal to L-1, and $Y_{i,l}$ meets a formula $Y_{i,l}=X_{i,l}^1 \times X_{i,l}^3$, $X_{i,l}^3$ is a complex number with modulus 1; and the indication information is used to indicate that $W_2$ includes N $X_{i,l}^1$ whose values are 0, the PMI2 is used to indicate a parameter of $W_2$, and the parameter of $W_2$ indicated by the PMI2 includes all $X_{i,l}^1$ in $W_2$ and $X_{i,l}^3$, corresponding to $X_{i,l}^1$ other than the N $X_{i,l}^1$ whose values are 0, in $W_2$, and does not include $X_{i,l}^3$, corresponding to the N $X_{i,l}^1$ whose values are 0, in $W_2$.

The transceiver 702 is configured to receive and send data under control of the processor 701.

In a possible implementation, $X_{i,l}^1$ represents a wideband amplitude, $X_{i,l}^2$ represents a subband amplitude, and $X_{i,l}^3$ represents a phase.

In a possible implementation, that the indication information is used to indicate that $W_2$ includes N $X_{i,l}^1$ whose values are 0 is specifically:

the indication information includes a quantity N of $X_{i,l}^1$ whose values are 0 in all elements of $W_2$; or the indication information includes a quantity $N_l$ of $X_{i,l}^1$ whose values are 0 in all elements of an $l^{th}$ column vector in $W_2$, where l is an integer greater than or equal to 0 and less than or equal to L-1, and $$\sum_{l=0}^{L-1} N_l = N;$$

or the indication information includes a quantity $N_l^0$ of $X_{i,l}^1$ whose values are 0 in first I elements of an $l^{th}$ column vector in $W_2$ and a quantity $N_l^1$ of $X_{i,l}^1$ whose values are 0 in last I elements of the column vector, where l is an integer greater than or equal to 0 and less than or equal to L-1, and $$\sum_{l=0}^{L-1} (N_l^0 + N_l^1) = N;$$

or the indication information includes a quantity N of $X_{i,l}^1$ whose values are 0 in a part of elements of $W_2$; or the indication information includes a quantity $T_l$ of $X_{i,l}^1$ whose values are 0 in a part of elements of an $l^{th}$ column vector in $W_2$, where l is an integer greater than or equal to 0 and less than or equal to L-1, and $$\sum_{l=0}^{L-1} T_l = N.$$

In a possible implementation, when obtaining the RI and the indication information based on a signal including the CSI, the processor 701 is specifically configured to:

decode bits that are in the signal including the CSI and that are used to carry the RI and the indication information, to obtain the RI and the indication information.

When obtaining the PMI2 based on the RI and the indication information, the processor 701 is specifically configured to:

decode, based on the RI and the indication information, a bit that is in the signal including the CSI and that is used to carry the PMI2, to obtain the PMI2.

In a possible implementation, when decoding, based on the RI and the indication information, the bit that is in the signal including the CSI and that is used to carry the PMI2, to obtain the PMI2, the processor 701 is specifically configured to:

determine, based on the RI and the indication information, the quantity of bits required to decode the PMI2; and decode, based on the RI and the quantity of bits, the bit that is used to carry the PMI2, to obtain the PMI2.

In a possible implementation, when decoding the bits that include the RI and the indication information and that are in the CSI signal, to obtain the RI and the indication information, the processor 701 is specifically configured to:

decode, based on a quantity Q1+Q2 of bits, a signal that includes the RI and the indication information and that is in the CSI signal, to obtain the RI and the indication information.

The RI is represented by using Q1 bits, and the indication information is represented by using Q2 bits.

In a possible implementation, when decoding the bits that are in the signal including the CSI and that are used to carry the RI and the indication information, to obtain the RI and the indication information, the processor 701 is specifically configured to:

obtain a status value based on the bits that are used to carry the RI and the indication information, where the status value is used to indicate combination information of the RI and the indication information; and obtain the RI and the indication information based on the status value.

In a possible implementation, the CSI further includes:

a first precoding matrix indicator PMI1, where the PMI is used to indicate $W_1$, $W_1$ meets $$W_1 = \begin{bmatrix} X_1 & 0 \\ 0 & X_1 \end{bmatrix},$$

$X_1$ is a matrix with $N_t/2$ rows and I columns, $X_1=[v_0 \ldots v_{M-1}]$, $v_m$ is a column vector including $N_t/2$ elements, m is an integer greater than or equal to 0 and less than or equal to I-1, and I is an integer greater than or equal to 1.

When determining W based on the RI and the PMI2, the processor 701 is specifically configured to:

determine W based on the RI, the PMI1, and the PMI2.

The processor 701, the transceiver 702, and the memory 703 are connected to each other by using a bus. The bus may be a PCI bus, an EISA bus, or the like. The bus may be classified into an address bus, a data bus, a control bus, and the like.

In FIG. 7, a bus architecture may include any quantity of interconnected buses and bridges, and specifically connects together a circuit of one or more processors represented by the processor 701 and a circuit of a memory represented by the memory 703. The bus architecture may further connect together various other circuits such as a peripheral device, a voltage stabilizer, and a power management circuit. These are well known in the art, and therefore are not further described in this specification. A bus interface provides an interface. The transceiver 702 may be a plurality of components. To be specific, the transceiver 702 includes a transmitter and a receiver and provides units configured to communicate with various other apparatuses on a transmission medium. The processor 701 is responsible for management of the bus architecture and general processing, and the memory 703 may store data that is used when the processor 701 performs an operation.

Optionally, the processor 701 may be a central processing unit, an ASIC, an FPGA, or a CPLD.

An embodiment of this application further provides a computer storage medium. The storage medium stores a software program. When being read and executed by one or more processors, the software program is capable of implementing the CSI receiving method performed by the network device in the foregoing embodiment.

An embodiment of this application further provides a network device, including at least one chip configured to perform the CSI receiving method performed by the network device in the foregoing embodiment.

An embodiment of this application provides a computer program product including an instruction. When running on a computer, the computer program product enables the computer to perform the CSI receiving method performed by the network device in the foregoing embodiment.

Figure 8:
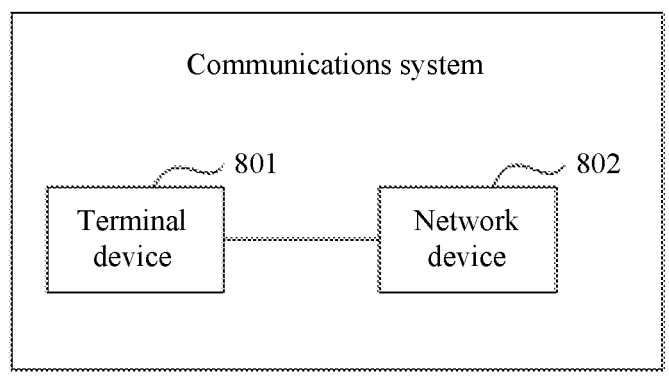
FIG. 8 is a schematic structural diagram of another communications system according to an embodiment of this application.

Based on the same concept, an embodiment of this application further provides a communications system. As shown in FIG. 8, the communications system includes a terminal device 801 and a network device 802. The terminal device 801 is configured to perform the method performed by the terminal device in the method provided in the embodiment corresponding to FIG. 2, and the terminal device 801 may be a device that is the same as the terminal device shown in FIG. 4 or FIG. 5. The network device 802 is configured to perform the method performed by the network device in the method provided in the embodiment corresponding to FIG. 2, and the network device 802 may be a device that is the same as the network device shown in FIG. 6 or FIG. 7. The communications system can be used to implement the CSI sending and receiving method provided in the embodiments of this application.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims of this application and their equivalent technologies.

What is claimed is:

1. A channel state information CSI receiving method, comprising:

receiving, by a network device from a terminal device, a signal comprising channel state information (CSI), the CSI comprising a rank indicator (RI), indication information, and a second precoding matrix indicator PMI2;

obtaining, by the network device, the RI and the indication information based on the signal comprising the CSI;

obtaining, by the network device, the PMI2 based on the RI and the indication information; and determining, by the network device, a precoding matrix W based on the rank indicator RI and the second precoding matrix indicator PMI2, wherein W comprises $W=W_1 \times W_2$, W is a matrix with $N_t$ rows and L columns, $W_1$ is a matrix with $N_t$ rows and 2I columns, $W_2$ is a matrix with 2I rows and L columns, $N_t$ is a quantity of antenna ports, L is a rank indicated by the RI, $N_t$ is greater than or equal to L, I is an integer greater than or equal to 1, an element at a location in an $i^{th}$ row and an $l^{th}$ column in $W_2$ is $Y_{i,l}$, i is an integer greater than or equal to zero and less than or equal to 2I−1, l is an integer greater than or equal to zero and less than or equal to L−1, $Y_{i,l}$ comprises $Y_{i,l}=X_{i,l}^1 \times X_{i,l}^2 \times X_{i,l}^3$, and $X_{i,l}^3$ is a complex number with modulus 1; and the indication information indicates that $W_2$ comprises M $X_{i,l}^1$ whose values are non-zero, the PMI2 indicates a parameter of $W_2$, the parameter of $W_2$ indicated by the PMI2 comprises all $X_{i,l}^1$ in $W_2$ and $X_{i,l}^2$ and $X_{i,l}^3$, which correspond to the M $X_{i,l}^1$ whose values are non-zero in $W_2$, and does not comprise $X_{i,l}^2$ and $X_{i,l}^3$ which correspond to $X_{i,l}^1$ other than the M $X_{i,l}^1$ whose values are non-zero in $W_2$.

2. The method according to claim 1, wherein $X_{i,l}^1$ represents a wideband amplitude, $X_{i,l}^2$ represents a subband amplitude, and $X_{i,l}^3$ represents a phase.

3. The method according to claim 1, wherein the indication information used to indicate that $W_2$ comprises M $X_{i,l}^1$ whose values are non-zero is:

the indication information comprises a quantity M of $X_{i,l}^1$ whose values are non-zero in all elements of $W_2$; or the indication information comprises a quantity $M_l$ of $X_{i,l}^1$ whose values are non-zero in all elements of an $l^{th}$ column vector in $W_2$, wherein l is an integer greater than or equal to zero and less than or equal to L−1, and $$\sum_{l=0}^{L-1} M_l = M;$$

or the indication information comprises a quantity $M_l^0$ of $X_{i,l}^1$ whose values are non-zero in first I elements of an $l^{th}$ column vector in $W_2$ and a quantity $M_l^1$ of $X_{i,l}^1$ whose values are non-zero in last I elements of the column vector, wherein l is an integer greater than or equal to zero and less than or equal to L−1, and $$\sum_{l=0}^{L-1} (M_l^0 + M_l^1) = M;$$

or the indication information comprises a quantity M of $X_{i,l}^1$ whose values are non-zero in a part of elements of $W_2$; or the indication information comprises a quantity $U_l$ of $X_{i,l}^1$ whose values are non-zero in a part of elements of an $l^{th}$ column vector in $W_2$, wherein l is an integer greater than or equal to zero and less than or equal to L−1, and $$\sum_{l=0}^{L-1} U_l = M.$$

4. The method according to claim 1, wherein the obtaining, by the network device, the RI and the indication information based on the signal comprising the CSI comprises:

decoding, by the network device, bits that are in the signal comprising the CSI and that are used to carry the RI and the indication information, the decoding obtaining the RI and the indication information; and the obtaining, by the network device, the PMI2 based on the RI and the indication information comprises:

decoding, by the network device based on the RI and the indication information, a bit that is in the signal comprising the CSI and that carries the PMI2, the decoding obtaining the PMI2.

5. The method according to claim 4, wherein the decoding, by the network device based on the RI and the indication information, a bit that is in the signal comprising the CSI and that carries the PMI2, the decoding obtaining the PMI2 comprises:

determining, by the network device based on the RI and the indication information, a quantity of bits required to decode the PMI2; and decoding, by the network device based on the RI and the quantity of bits, the bit that carries the PMI2, the decoding obtaining the PMI2.

6. The method according to claim 4, wherein the decoding, by the network device, bits that comprise the RI and the indication information and that are in the CSI signal, the decoding obtaining the RI and the indication information comprises:

decoding, by the network device based on a quantity Q1+Q2 of bits, a signal that comprises the RI and the indication information and that is in the CSI signal, the decoding obtaining the RI and the indication information;

wherein the RI is represented by Q1 bits, and the indication information is represented by Q2 bits.

7. The method according to claim 4, wherein the decoding, by the network device, bits that are in the signal comprising the CSI and that carry the RI and the indication information, the decoding obtaining the RI and the indication information comprises:

obtaining, by the network device, a status value based on the bits that carry the RI and the indication information, wherein the status value indicates combination information of the RI and the indication information; and obtaining, by the network device, the RI and the indication information based on the status value.

8. The method according to claim 1, wherein the CSI further comprises:

a first precoding matrix indicator PMI1, wherein the PMI indicates $W_1$, $W_1$ comprises $$W_1 = \begin{bmatrix} X_1 & 0 \\ 0 & X_1 \end{bmatrix},$$

$X_1$ is a matrix with $N_t/2$ rows and I columns, $X_1 = [v_0 \ldots v_{M-1}]$, $v_m$ is a column vector comprising $N_t/2$ elements, m is an integer greater than or equal to zero and less than or equal to I−1, and I is an integer greater than or equal to 1.

9. The method according to claim 8, wherein the determining, by the network device, W based on the RI and the PMI2 comprises:

determining, by the network device, W based on the RI, the PMI1, and the PMI2.

10. An apparatus, comprising:

a transceiver configured to receive a signal comprising channel state information (CSI) from a terminal device, the CSI comprising a rank indicator (RI), indication information, and a second precoding matrix indicator PMI2; and a processor configured to obtain the RI and the indication information based on the signal comprising the CSI;

the processor further configured to obtain the PMI2 based on the RI and the indication information; and the processor further configured to obtain the PMI2 based on the RI and the indication information; and the processor further configured to determine a precoding matrix W based on the rank indicator RI and the second precoding matrix indicator PMI2;

W comprises $W=W_1 \times W_2$, W is a matrix with $N_t$ rows and L columns, $W_1$ is a matrix with $N_t$ rows and 2I columns, $W_2$ is a matrix with 2I rows and L columns, $N_t$ is a quantity of antenna ports, L is a rank indicated by the RI, $N_t$ is greater than or equal to L, I is an integer greater than or equal to 1, an element at a location in an $i^{th}$ row and an $l^{th}$ column in $W_2$ is $Y_{i,l}$, i is an integer greater than or equal to zero and less than or equal to 2I−1, l is an integer greater than or equal to zero and less than or equal to L−1, $Y_{i,l}$ comprises $Y_{i,l}=X_{i,l}^1 \times X_{i,l}^2 \times X_{i,l}^3$, and $X_{i,l}^3$ is a complex number with modulus 1;

the indication information indicates $W_2$ comprises M $X_{i,l}^1$ whose values are non-zero, the PMI2 indicates a parameter of $W_2$, the parameter of $W_2$ indicated by the PMI2 comprises all $X_{i,l}^1$ in $W_2$, and $X_{i,l}^2$ and $X_{i,l}^3$, which correspond to the M $X_{i,l}^1$ whose values are non-zero in $W_2$ and does not comprise $X_{i,l}^2$ and $X_{i,l}^3$, which correspond to $X_{i,l}^1$ other than the M $X_{i,l}^1$ whose values are non-zero in $W_2$.

11. The apparatus according to claim 10, wherein $X_{i,l}^1$ represents a wideband amplitude, $X_{i,l}^2$ represents a subband amplitude, and $X_{i,l}^3$ represents a phase.

12. The apparatus according to claim 10, wherein the indication information used to indicate that $W_2$ comprises M $X_{i,l}^1$ whose values are non-zero is:

the indication information comprises a quantity M of $X_{i,l}^1$ whose values are non-zero in all elements of $W_2$; or the indication information comprises a quantity $M_l$ of $X_{i,l}^1$ whose values are non-zero in all elements of an $l^{th}$ column vector in $W_2$, wherein l is an integer greater than or equal to zero and less than or equal to L−1, and $$\sum_{l=0}^{L-1} M_l = M;$$

or the indication information comprises a quantity $M_l^0$ of $X_{i,l}^1$ whose values are non-zero in first I elements of an $l^{th}$ column vector in $W_2$ and a quantity $M_l^1$ of $X_{i,l}^1$ whose values are non-zero in last I elements of the column vector, wherein l is an integer greater than or equal to zero and less than or equal to L−1, and $$\sum_{l=0}^{L-1} (M_l^0 + M_l^1) = M;$$

or the indication information comprises a quantity M of $X_{i,l}^1$ whose values are non-zero in a part of elements of $W_2$; or the indication information comprises a quantity $U_l$ of $X_{i,l}^1$ whose values are non-zero in a part of elements of an $l^{th}$ column vector in $W_2$, wherein l is an integer greater than or equal to zero and less than or equal to L−1, and $$\sum_{l=0}^{L-1} U_l = M.$$

13. The apparatus according to claim 10, wherein the processor is configured to:

decode bits that are in the signal comprising the CSI and that are used to carry the RI and the indication information, to obtain the RI and the indication information; and decode, based on the RI and the indication information, a bit that is in the signal comprising the CSI and that carries the PMI2, to obtain the PMI2.

14. The apparatus according to claim 13, wherein the processor is configured to:

determine, based on the RI and the indication information, a quantity of bits required to decode the PMI2; and decode, based on the RI and the quantity of bits, the bit that carries the PMI2, to obtain the PMI2.

15. The apparatus according to claim 13, wherein the processor is configured to:

decode, based on a quantity Q1+Q2 of bits, a signal that comprises the RI and the indication information and that is in the CSI signal, to obtain the RI and the indication information, wherein the RI is represented by using Q1 bits, and the indication information is represented by using Q2 bits.

16. The apparatus according to claim 13, wherein the processor is configured to:

obtain a status value based on the bits that are used to carry the RI and the indication information, wherein the status value indicates combination information of the RI and the indication information; and obtain the RI and the indication information based on the status value.

17. The apparatus according to claim 10, wherein the CSI further comprises:

a first precoding matrix indicator PMI1, wherein the PMI indicates $W_1$, $W_1$ comprises $$W_1 = \begin{bmatrix} X_1 & 0 \\ 0 & X_1 \end{bmatrix},$$

$X_1$ is a matrix with $N_t/2$ rows and I columns, $X_1=[v_0 \ldots v_{M-1}]$, $v_m$ is a column vector comprising $N_t/2$ elements, m is an integer greater than or equal to zero and less than or equal to I−1, and I is an integer greater than or equal to 1.

18. The apparatus according to claim 17, wherein the processor is configured to:

determine W based on the RI, the PMI1, and the PMI2.

19. The apparatus according to claim 10, wherein the apparatus is a network device.

20. A non-transitory computer readable storage medium, comprising computer program codes which when executed by a processor cause the processor to execute the steps of:

receiving a signal that comprises channel state information (CSI), wherein the CSI comprises a rank indicator (RI), indication information, and a second precoding matrix indicator PMI2;

obtaining the RI and the indication information based on the signal comprising the CSI;

obtaining the PMI2 based on the RI and the indication information; and determining a precoding matrix W based on the rank indicator RI and the second precoding matrix indicator PMI2, wherein:

W comprises $W=W_1 \times W_2$, W is a matrix with $N_t$ rows and L columns, $W_1$ is a matrix with $N_t$ rows and 2I columns, $W_2$ is a matrix with 2I rows and L columns, $N_t$ is a quantity of antenna ports, L is a rank indicated by the RI, $N_t$ is greater than or equal to L, I is an integer greater than or equal to 1, an element at a location in an $i^{th}$ row and an $l^{th}$ column in $W_2$ is $Y_{i,l}$, i is an integer greater than or equal to zero and less than or equal to 2I−1, l is an integer greater than or equal to zero and less than or equal to L−1, $Y_{i,l}$ comprises $Y_{i,l}=X_{i,l}^1 \times X_{i,l}^2 \times X_{i,l}^3$, and $X_{i,l}^3$ is a complex number with modulus 1; and the indication information indicates that $W_2$ comprises M $X_{i,l}^1$ whose values are non-zero, the PMI2 indicates a parameter of $W_2$, the parameter of $W_2$ indicated by the PMI2 comprises all $X_{i,l}^1$ in $W_2$ and $X_{i,l}^2$ and $X_{i,l}^3$, which correspond to the M $X_{i,l}^1$ whose values are non-zero in $W_2$, and does not comprise $X_{i,l}^2$ and $X_{i,l}^3$ which correspond to $X_{i,l}^1$ other than the M $X_{i,l}^1$ whose values are non-zero in $W_2$.

21. The non-transitory computer readable storage medium according to claim 20, wherein $X_{i,l}^1$ represents a wideband amplitude, $X_{i,l}^2$ represents a subband amplitude, and $X_{i,l}^3$ represents a phase.

22. The non-transitory computer readable storage medium according to claim 20, wherein the indication information used to indicate that $W_2$ comprises M $X_{i,l}^1$ whose values are non-zero is:

the indication information comprises a quantity M of $X_{i,l}^1$ whose values are non-zero in all elements of $W_2$; or the indication information comprises a quantity $M_l$ of $X_{i,l}^1$ whose values are non-zero in all elements of an $l^{th}$ column vector in $W_2$, wherein l is an integer greater than or equal to zero and less than or equal to L−1, and $$\sum_{l=0}^{L-1} M_l = M;$$

or the indication information comprises a quantity $M_l^0$ of $X_{i,l}^1$ whose values are non-zero in first I elements of an $l^{th}$ column vector in $W_2$ and a quantity $M_l^1$ of $X_{i,l}^1$ whose values are non-zero in last I elements of the column vector, wherein l is an integer greater than or equal to zero and less than or equal to L−1, and $$\sum_{l=0}^{L-1} (M_l^0 + M_l^1) = M;$$

or the indication information comprises a quantity M of $X_{i,l}^1$ whose values are non-zero in a part of elements of $W_2$; or the indication information comprises a quantity $U_l$ of $X_{i,l}^1$ whose values are non-zero in a part of elements of an $l^{th}$ column vector in $W_2$, wherein l is an integer greater than or equal to zero and less than or equal to L−1, and $$\sum_{l=0}^{L-1} U_l = M.$$

23. The non-transitory computer readable storage medium according to claim 20, further comprising computer program codes which when executed by the processor cause the processor to execute the steps of:

decoding bits that are in the signal comprising the CSI and that carry the RI and the indication information, the decoding obtaining the RI and the indication information; and decoding, based on the RI and the indication information, a bit that is in the signal comprising the CSI and that carries the PMI2, the decoding obtaining the PMI2.

24. The non-transitory computer readable storage medium according to claim 20, further comprising computer program codes which when executed by the processor cause the processor to execute the steps of:

determining, based on the RI and the indication information, a quantity of bits required to decode the PMI2; and decoding, based on the RI and the quantity of bits, the bit that carries the PMI2, the decoding obtaining the PMI2.

25. The non-transitory computer readable storage medium according to claim 24, further comprising computer program codes which when executed by the processor cause the processor to execute the steps of:

decoding, based on a quantity Q1+Q2 of bits, a signal that comprises the RI and the indication information and that is in the CSI signal, the decoding obtaining the RI and the indication information, wherein the RI is represented by using Q1 bits, and the indication information is represented by using Q2 bits.

26. The non-transitory computer readable storage medium according to claim 24, further comprising computer program codes which when executed by the processor cause the processor to execute the steps of:

obtaining a status value based on the bits that carry the RI and the indication information, wherein the status value indicates combination information of the RI and the indication information; and obtaining the RI and the indication information based on the status value.

27. The non-transitory computer readable storage medium according to claim 20, wherein the CSI further comprises:

a first precoding matrix indicator PMI1, wherein the PMI indicates $W_1$, $W_1$ comprises $$W_1 = \begin{bmatrix} X_1 & 0 \\ 0 & X_1 \end{bmatrix},$$

$X_1$ is a matrix with $N_t/2$ rows and I columns, $X_1=[v_0 \ldots v_{M-1}]$, $v_m$ is a column vector comprising $N_t/2$ elements, m is an integer greater than or equal to zero and less than or equal to I−1, and I is an integer greater than or equal to 1.

28. The non-transitory computer readable storage medium according to claim 27, further comprising computer program codes which when executed by the processor cause the processor to execute the steps of:

determining W based on the RI, the PMI1, and the PMI2.

* * * * *

UNITED STATES PATENT AND TRADEMARK OFFICE
CERTIFICATE OF CORRECTION

PATENT NO. : 10,511,367 B2
APPLICATION NO. : 16/279329
DATED : December 17, 2019
INVENTOR(S) : Ruiqi Zhang, Xueru Li and Di Zhang Page 1 of 1

It is certified that error appears in the above-identified patent and that said Letters Patent is hereby corrected as shown below:

In the Claims

In Claim 10, Column 40, delete duplicate Lines 66-67, comprising "the processor further configured to obtain the PMI2 based on the RI and the indication information; and".

Signed and Sealed this
Eighteenth Day of August, 2020

Andrei Iancu
*Director of the United States Patent and Trademark Office*